United States Patent
Shinkawa et al.

(10) Patent No.: US 6,252,828 B1
(45) Date of Patent: Jun. 26, 2001

(54) ELECTRONICALLY CONTROLLED MECHANICAL TIMEPIECE AND CONTROL METHOD THEREFOR

(75) Inventors: Osamu Shinkawa, Suwa; Kunio Koike, Matsumoto, both of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/505,931

(22) Filed: Feb. 14, 2000

Related U.S. Application Data

(63) Continuation of application No. 09/319,048, filed as application No. PCT/JP98/04395 on Sep. 30, 1998, now Pat. No. 6,041,021.

(30) Foreign Application Priority Data

Sep. 30, 1997 (JP) .................................................... 9-265204

(51) Int. Cl.⁷ ...................................................... G04B 1/00
(52) U.S. Cl. ............................................ 368/203; 368/204
(58) Field of Search .................................. 368/64, 66, 76, 368/80, 157, 160, 203, 204

(56) References Cited

U.S. PATENT DOCUMENTS

| | | |
|---|---|---|
| 5,517,469 | 5/1996 | Wiget . |
| 5,615,178 | 3/1997 | Takakura et al. . |
| 5,699,322 | 12/1997 | Born . |
| 5,740,131 | 4/1998 | Bernasconi . |
| 5,751,666 | 5/1998 | Farine et al. . |

FOREIGN PATENT DOCUMENTS

| | | |
|---|---|---|
| 0 239 820 | 10/1987 | (EP) . |
| 49-84680 | 8/1974 | (JP) . |
| 58-168398 | 10/1983 | (JP) . |
| 7-119812 | 12/1995 | (JP) . |
| 8-36072 | 2/1996 | (JP) . |
| 8-101284 | 4/1996 | (JP) . |
| 9-182305 | 7/1997 | (JP) . |
| 10-48355 | 2/1998 | (JP) . |
| 10-82870 | 3/1998 | (JP) . |

Primary Examiner—Vit Miska

(57) ABSTRACT

An electronically controlled mechanical timepiece includes: a voltage-controlled oscillator (25) including a generator that uses a rotor (12) driven by a spring (1a) to rotate, and a brake circuit (23) for controlling the rotation cycle of the generator (20); and a rotation control means (50) for controlling the rotation cycle of (50) includes a phase-comparison circuit (54) for comparing the phases of rectangular-wave pulses fr output from a VCO (25) and time standard signal fs, and a brake control circuit (56) for inputting, based on an output from the phase-comparison circuit (54), a signal for controlling the brake circuit (23) to a voltage-controlled oscillator (25). By providing the VCO (25) and the phase-comparison circuit (54), PLL control is realized to enable a rapidly responsive system.

8 Claims, 17 Drawing Sheets

ELECTRONICALLY CONTROLLED MECHANICAL TIMEPIECE AND CONTROL METHOD THEREFOR

CROSS REFERENCE TO RELATED APPLICATION

This application is a continuation of co-pending application Ser. No. 09/319,048, filed Jun. 24, 1999 now U.S. Pat. No. 6,041,021, which is incorporated by reference herein in its entirety which is a 371 of PCT/JP98/04395 filed Sep. 30, 1998.

BACKGROUND OF THE INVENTION

1. Field of the Invention

The present invention relates to electronically controlled mechanical timepieces that accurately drive pointers fixed to a wheel train by using a generator to convert mechanical energy in the unwinding mode of a spring into electrical energy, and controlling the rotation cycle of the generator by driving a rotation control circuit with the electrical energy, and to control methods therefor.

2. Description of the Related Art

An electronically controlled mechanical timepiece described in Japanese Examined Patent Publication No. 7-119812 is known as one for indicating an accurate time that accurately drives pointers fixed to a wheel train by using a generator to convert mechanical energy in the unwinding mode of a spring into electrical energy, and controlling a current flowing in the coil of the generator by driving a rotation control circuit with the electrical energy.

In the electronically controlled mechanical timepiece, by inputting a signal based on the rotation of the generator into a counter while inputting a signal from a quartz oscillator into the counter, comparing values in the counter, and controlling the generator based on the difference, rotation velocity is controlled. The counter compares the phase differences of reference clock pulses (Ref-pulses) and generator-rotation-cycle pulses (G-pulses), and increases the value of a U/D counter if the G-pulses are ahead, or decreases the value if the G-pulses are behind. The counter consists of a so-called integral counter.

When a value obtained by measuring the time of one cycle of the Ref-pulses is equal to a value obtained by the integral counter, braking of the generator is performed, and braking is continuously performed until measurement of the time of one cycle of the Ref-pulses terminates. Accordingly, the value of the integral counter sets a braking release time. That is, the value of the integral counter is multiplied by braking release time N at which the average velocity of the G-pulses is equal to a target velocity (Ref-pulses). In other words, integral control is employed in this system.

According to the integral control, the average velocity of a rotor over a sufficient duration can be controlled to a velocity in a set time, whereby pointers can be accurately moved at a controlled velocity because signals output in each cycle are compared, while the signals are being counted. However, the integral control has a problem in that the rotation velocity of the rotor cannot be instantly adjusted, which causes slow responsiveness. The integral control also has a problem in that a plurality of phase excursions is generated until the relationship between spring force and braking force is set so as to correspond to a target frequency.

The integral control can be expressed in the block diagram in FIG. 20.

In general, it is known that a transfer function used for a generator or motor is 1/s(sT+1). This consists of a first-order-lag transfer function 101 and an integral term 102 of 1/s. Accordingly, an integral factor is included in the generator as an object to be controlled. Bode diagrams on the assumption that only the integral control is performed for the object are shown in FIGS. 21 and 22.

In the Bode diagrams, it is required as a condition for stable rotation control that a phase allowance, i.e., the phase at a gain of zero db (gain intersection), be ahead of −180° and that gain allowance, i.e., the gain at a phase of −180° (phase intersection), be not more than zero db.

However, in the case where only the integral control is performed, a phase delay of −90° occurs in the object, and a further phase delay of −90° occurs due to the integral control, as shown in FIG. 21, so that the phase is at approximately −180°. Thus, stable control is difficult because the integral control alone cannot obtain phase allowance and gain allowance. Accordingly, the timepiece in Japanese Examined Patent Publication No. 7-119812 must perform control at a very low frequency, and its responsive characteristic is positioned at approximately 0.016 Hz or less.

A case where the gain of the integral counter is set to be 100 times greater is shown in FIG. 22. Also, in this case, phase allowance is behind −180°, and stable control cannot be anticipated.

As is clear from the above-described data, by performing control using only the conventional integral control, average velocity control can be performed, but a problem occurs in that phase excursions cannot be eliminated.

In addition, slow control response causes a problem in that almost nothing can compensate for a rapid disturbance as in the case when acceleration is generated in a watch by a swing of an arm.

OBJECTS OF THE INVENTION

It is an object of the present invention to provide an electronically controlled mechanical timepiece that is free from phase excursions and has rapid control system response, and to a control method therefor.

SUMMARY OF THE INVENTION

According to the present invention, there is provided an electronically controlled mechanical timepiece including: a mechanical energy source; a generator driven by the mechanical energy source connected to the generator via a wheel train, which generates induced electric power for supplying electric energy; a brake circuit for braking the generator; pointers joined to the wheel train; and a rotation control circuit for controlling the rotation cycle of the generator by controlling the brake circuit; wherein the rotation control circuit includes: a rotation detection circuit for generating a rotation signal of the generator; a target-signal generating circuit for generating a target signal corresponding to a target number of revolutions; and a phase-difference compensating circuit for detecting the phase difference of the target signal output from the rotation detection circuit, and the target signal output from the target-signal generating circuit, and outputting a phase-difference compensation signal which is used as a braking control signal in the brake circuit.

An electronically controlled mechanical timepiece of the present invention uses a mechanical energy source such as a spring to drive pointers and a generator, and controls the number of rotations of a rotor, i.e., the pointers by braking the generator. At this time, the electronically controlled mechanical timepiece compares the phases of a rotation signal of the generator and a target signal such as a timepiece's standard signal, and inputs based on the phase difference a brake control signal to a brake circuit for the generator, whereby a so-called phase-synchronization circuit or phase-locked-loop control (PLL control) is realized in an electronically controlled mechanical timepiece. Accordingly, since a braking level can be set by comparing the waveforms of generated power in each cycle, the activation of a locked range realizes a stable, rapidly responsive system and enables the elimination of phase excursions unless the waveforms of generated power remarkably change suddenly.

Under these circumstances, it is preferable that the generator and the brake circuit constitute a voltage-controlled oscillator, and that the phase-difference compensating circuit include: a phase-comparison circuit for comparing the phases of the rotation signal and the target signal; and a brake control circuit for inputting to the voltage-controlled oscillator the phase-difference compensation signal for controlling the brake circuit based on an output from the phase-comparison circuit.

Under these circumstances, it is preferable that the rotation control circuit include a waveform shaping circuit for converting the output waveform of the voltage-controlled oscillator into rectangular-wave pulses, and outputting as the rotation signal to the phase-comparison circuit.

The output waveform of the voltage-controlled oscillator changes in accordance with a control method therefor. However, by providing the waveform shaping circuit, the different part of the output waveform can be absorbed, and rectangular-wave pulses capable of being compared with a time standard signal can be output to the phase-comparison circuit, irrespective of the output waveform from the voltage-controlled oscillator. Thus, the phase-comparison circuit, etc., can be used in common to enable a reduction in a component cost.

In addition, it is preferable that the rotation control circuit include a frequency-to-velocity converter for converting the frequency of an output signal from the voltage-controlled oscillator into velocity, and that the brake control circuit be capable of outputting a signal which controls the brake circuit, based on an output from the phase-comparison circuit and an output from the frequency-to-velocity converter.

By providing the frequency-to-velocity converter, the time constant of a control circuit can be reduced, and responsiveness can be further improved.

Moreover, it is preferable that the phase-difference compensating circuit include a phase-difference detection circuit and a compensation-signal generating circuit for receiving an output from the phase-difference detection circuit, that the rotation signal and the target signal be repetitive pulses, that the phase-difference detection circuit include counters for counting the numbers of rises or falls of the respective signals, and that one counter be incremented or decremented when the target signal rises or falls, or is incremented or decremented when the rotation signal rises or falls, and outputs an output of the counter as a phase-difference signal to the compensation-signal generating circuit.

By using a counter to constitute the phase-difference detection circuit, circuit arrangement can be simplified, and a cost can be also reduced. In addition, a counter capable of holding a plurality of counts can be used. Thus, a phase difference in a broad range can be detected, and even if phase differences are totaled, the total can be held. Accordingly, control in accordance with a total of phase differences can be performed, and more accurate velocity-controlled control can be performed.

Under these circumstances, it is preferable that the phase-difference detection circuit include: an integral counter for measuring a total of the phase excursion periods of the rotation signal and the target signal; a proportional counter for measuring phase excursion periods; and an adder for increasing or reducing the value of each counter in accordance with a lead or lag of the phase excursion of the rotation signal with respect to the target signal.

According to the present invention, there is provided a control method for an electronically controlled mechanical timepiece including a mechanical energy source; a generator driven by the mechanical energy source connected to the generator via a wheel train, which generates induced electric power for supplying electric energy, a brake circuit for braking the generator, pointers joined to the wheel train, and a rotation control circuit for controlling the rotation cycle of the generator by controlling the brake circuit, wherein a rotation signal of the generator and a target signal generated in accordance with a target number of revolutions are compared to detect the phase difference therebetween, and a phase-difference compensation signal in accordance with the phase difference is used to control the brake circuit.

In the present invention, phase excursions can be eliminated, and stable, rapidly responsive control system is realized because an electronically controlled mechanical timepiece can be controlled by phase-synchronization circuit control (PLL control).

Under these circumstances, it is preferable that the control method comprise: using an integral counter to measure a total of the phase excursion periods of the rotation signal and the target signal, and using a proportional counter to measure phase excursion periods; determining a lead or lag of the phase excursion of the rotation signal with respect to the target signal; computing a phase-difference compensation signal for setting a braking time by increasing or reducing the value of each counter in accordance with the determined result; and using the phase-difference compensation signal to control the brake circuit. The setting of the braking time includes not only the case where a braking time is directly set, but also the case where indirect braking is performed by setting a braking release time in which braking is not performed in a predetermined cycle.

BRIEF DESCRIPTION OF THE DRAWINGS

In the drawings, wherein like reference symbols refer to like parts.

BEST MODE FOR CARRYING OUT THE INVENTION

In order that the present invention may be described for more details, it will be described with reference to the attached drawings.

Figure 1:
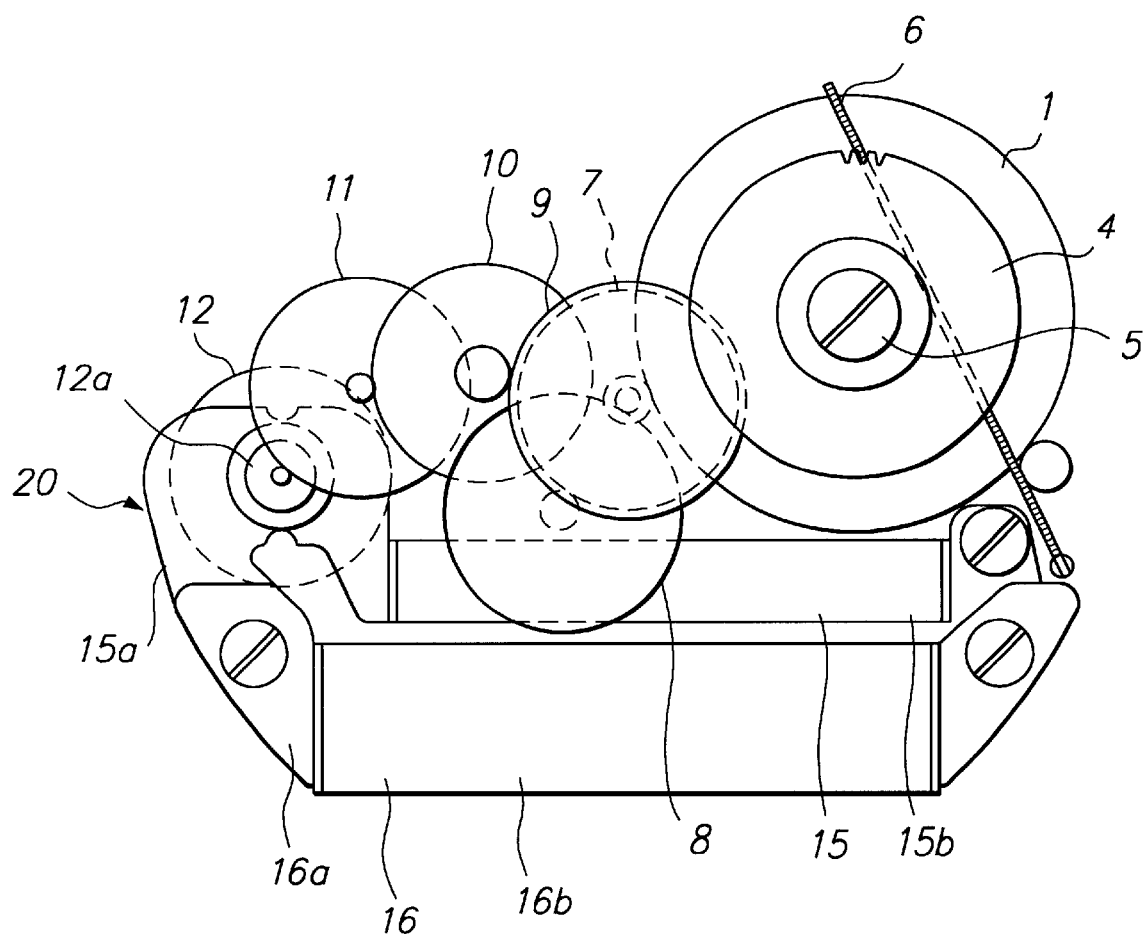
FIG. 1 is a plan view showing main components of an electronically controlled mechanical timepiece according to a first embodiment of the present invention.
Figure 2:
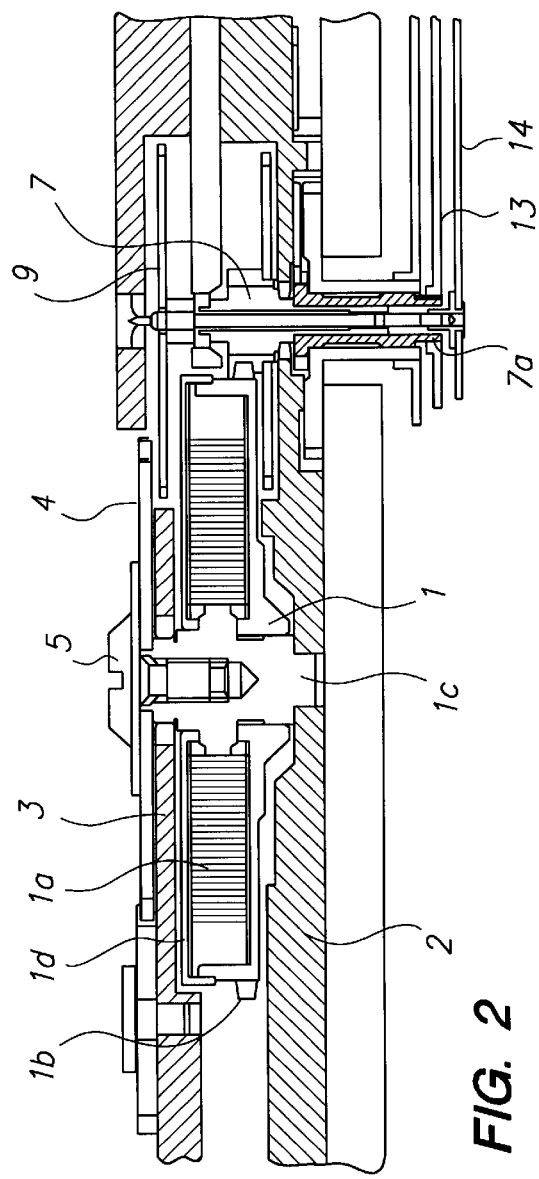
FIG. 2 is a cross-sectional view showing a main part in FIG. 1.
Figure 3:
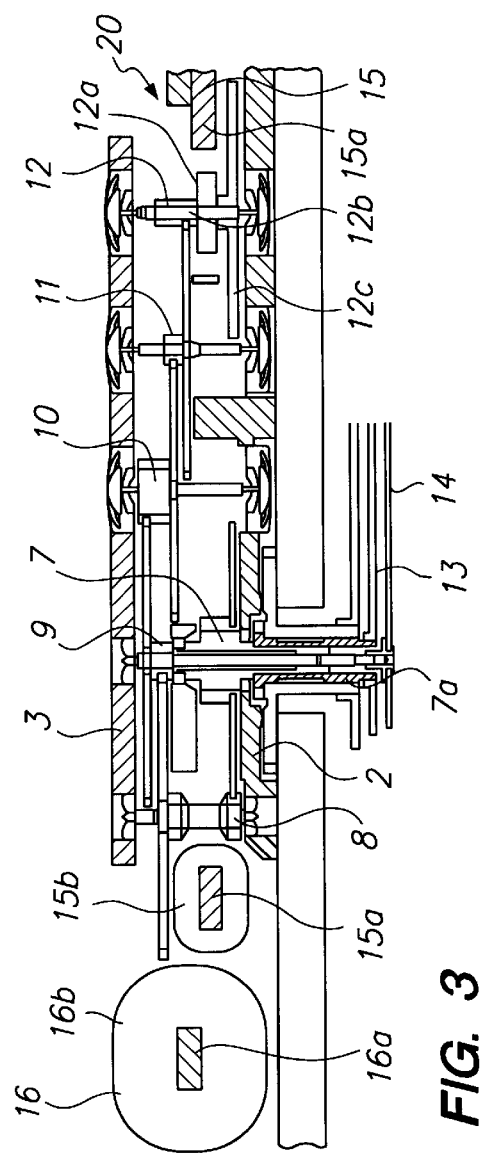
FIG. 3 is a cross-sectional view showing a main part in FIG. 1.

FIG. 1 is a plan view showing main parts of an electronically controlled mechanical timepiece according to a first embodiment of the present invention, and FIG. 2 and FIG. 3 are section views of the timepiece.

The electronically controlled mechanical timepiece includes a barrel drum 1 comprised of a spring 1a, a barrel gear 1b, a barrel arbor 1c, and a barrel cover 1d. The spring 1a has an exterior end fixed to the barrel gear 1b, and an interior end fixed to the barrel arbor 1c. The barrel arbor 1c is supported by a main plate 2 and a wheel train bridge 3, and is fixed by a ratchet fastener 5 so as to rotate together with a ratchet wheel 4.

The ratchet wheel 4 is engaged in a click 6 so as to rotate clockwise but not to rotate counterclockwise. A description of a technique for winding the spring 1a by rotating the ratchet wheel 4 clockwise is omitted since the technique is similar to that in the self-winding or hand-winding mechanism of a mechanical timepiece. The rotation of the barrel gear 1b is transmitted to a center wheel 7 at a speed increased 7 times. Successively, it is transmitted to a third wheel 8 at a speed increased 6.4 times. It is transmitted to a second wheel 9 at a speed increased 9.375 times. It is transmitted to a fifth wheel 10 at a speed increased 3 times. It is transmitted to a sixth wheel 11 at a speed increased 10 times. It is transmitted to a rotor 12 at a speed increased 10 times. In all, the speed of the rotation is increased 126000 times.

A cannon pinion 7a is fixed to the center wheel 7. A minute pointer 13 is fixed to the cannon pinion 7a. A second pointer 14 is fixed to second wheel 9. Accordingly, in order that the center wheel 7 may be rotated at 1 rph and that the second wheel 9 may be rotated at 1 rpm, a rotor 12 may be controlled so as to rotate at 5 rps. At this time, the barrel gear 1b rotates at 1/7 rph.

The electronically controlled mechanical timepiece includes a generator 20 comprised of the rotor 12, a stator 15, and a coil block 16. The rotor 12 consists of a rotor magnet 12a, a rotor pinion 12b, and a rotor inertia disk 12c. The rotor inertia disk 12c is for suppressing a change in the revolution of the rotor 12 against a change in driving torque from the barrel drum 1. The stator 15 is a stator base 15a with forty thousand turns of a stator coil 15b wound around it.

The coil block 16 is a magnetic core 16a with eleven thousand turns of a coil 16b wound around it. The stator base 15a and the magnetic core 16a are made of PC permalloy or the like. The stator coil 15b and the coil 16b are connected in series so that an output voltage as the sum of voltages generated by them is obtained.

Next, the control circuit of the electronically controlled mechanical timepiece is described with reference to FIGS. 4 to 9.

Figure 4:
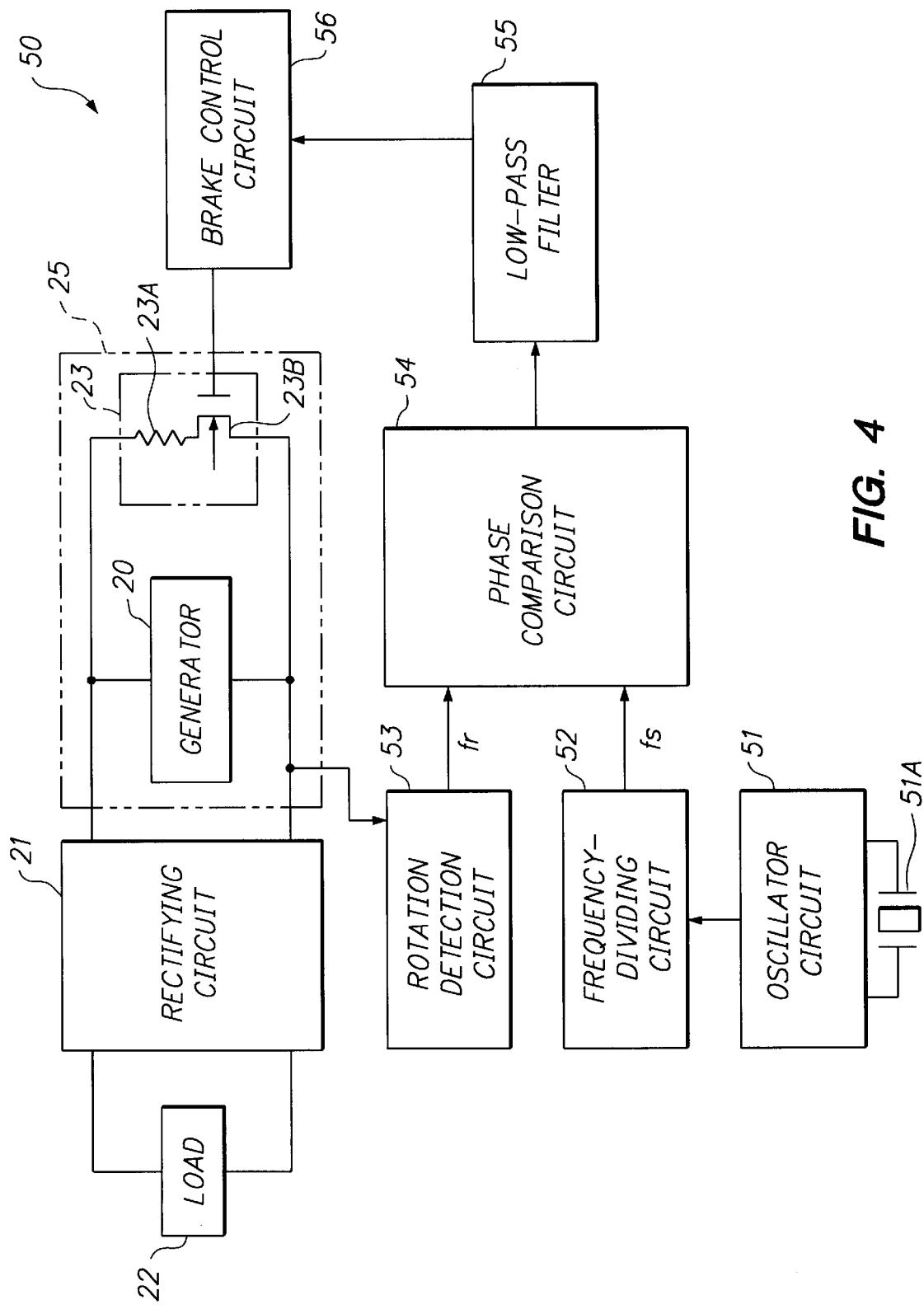
FIG. 4 is a block diagram showing functions of a first embodiment of the present invention.

In FIG. 4, a block diagram showing the functions of this embodiment is shown.

An ac output from the generator 20 is increased in voltage and rectified by a rectifying circuit 21 having voltage-raising rectification, full-wave rectification, half-wave rectification, transistor rectification, etc. A load 22 such as an IC for controlling a rotation control circuit or the like, and a quartz oscillator or the like, is connected to the rectifying circuit 21. In FIG. 4, for convenience of explanation, each functional circuit included in the IC is described separately from the load 22.

A brake circuit 23, formed by connecting in series a braking resistor 23A and an N-ch or P-ch transistor 23B, is connected to the generator 20. The generator 20 and the brake circuit 23 constitute a voltage-controlled oscillator (VCO) 25. In the brake circuit 23, other than the braking resistor 23A, a diode may be inserted if necessary.

A rotation control circuit 50 is connected to the VCO 25.

The rotation control circuit 50 includes an oscillator circuit 51, a frequency-dividing circuit 52, a rotation detection circuit 53 for the rotor 12, a phase comparison circuit (PC) 54, a low-pass filter (LPF) 55, and a brake control circuit 56.

The oscillator circuit 51 uses a quartz oscillator 51A to output an oscillating signal, and the oscillating signal is frequency-divided by the frequency-dividing circuit 52 to have a constant cycle. The frequency-divided signal is output as, for example, a 10-Hz time-standard signal (reference cycle signal) fs to the phase comparison circuit 54. The time-standard signal (reference cycle signal) fs is used as a target revolution of the generator 20. Thus, the oscillator circuit 51 and the frequency-dividing circuit 52 constitute a target-signal generating circuit that generates a target signal (time standard signal fs) corresponding to a target revolution.

The rotation detection circuit 53 receives an output waveform from the VCO 25 at a high impedance so that the generator 20 is not affected. It performs the waveform processing of the output to form rectangular-wave pulses fr, and outputs them to the phase comparison circuit 54.

Accordingly, the rotation detection circuit 53 generates a rotation signal synchronized with the rotation of the generator 20.

The phase comparison circuit 54 compares the phases of time reference signal fs from the frequency-dividing circuit 52 and rectangular-wave pulses fr from the rotation detection circuit 53, and outputs a difference signal. The difference signal is processed by the LPF 55 so that its high-frequency components are eliminated, before being input to the brake control circuit 56.

The brake control circuit 56 inputs, based on the signal, to the VCO 25, a control signal to the brake circuit 23. Thereby, phase synchronization control is realized.

Accordingly, the phase comparison circuit 54, the LPF 55, and the brake control circuit 56 constitute a phase-difference compensating circuit that detects the phase difference between the rotation signal output from the rotation detection circuit and the target signal from the target-signal generating circuit, and outputs a phase-compensation signal that becomes the brake control signal in the brake circuit 23.

Figure 5:
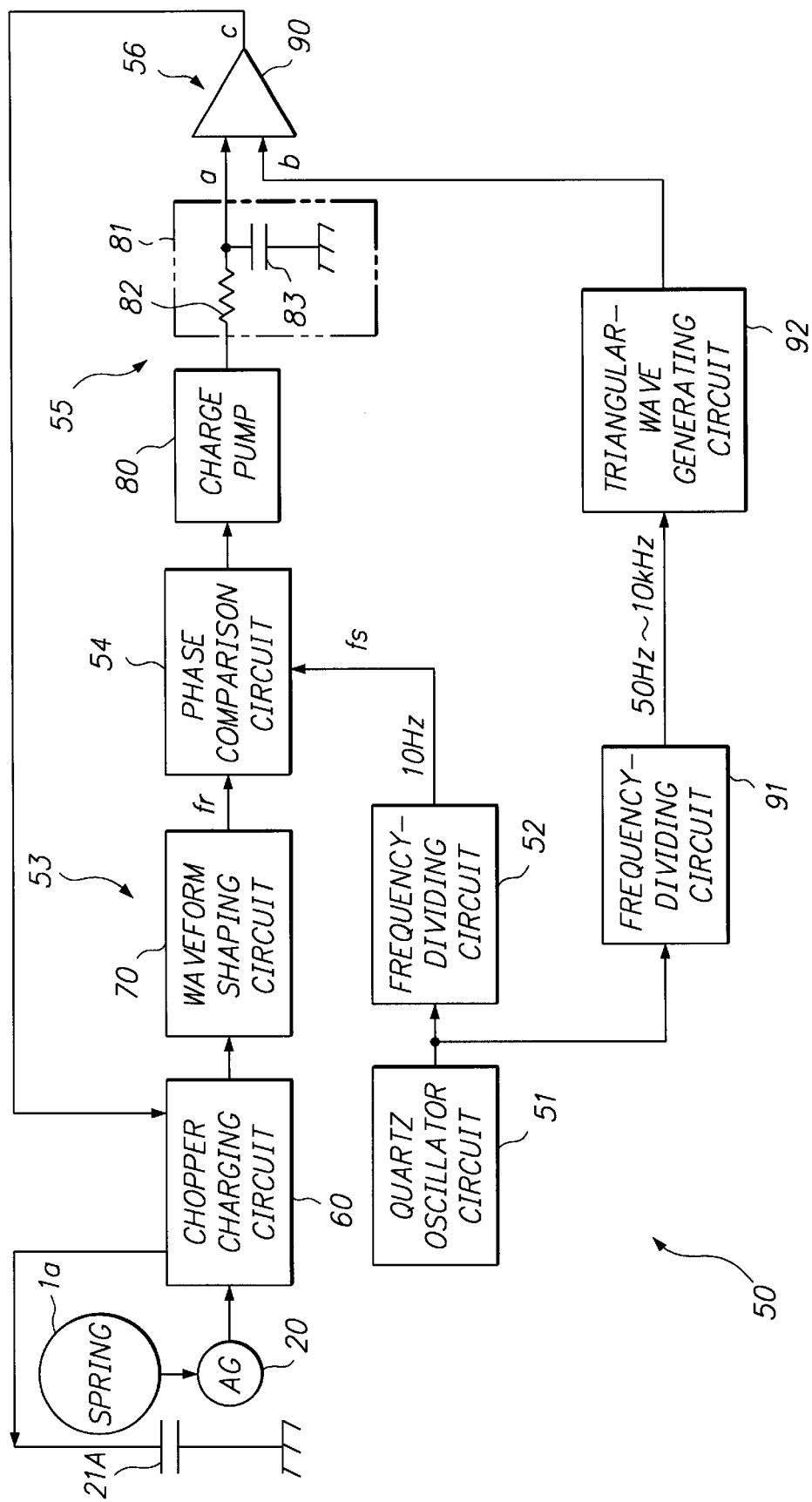
FIG. 5 is a block diagram showing the construction of a first embodiment of the present invention.
Figure 6:
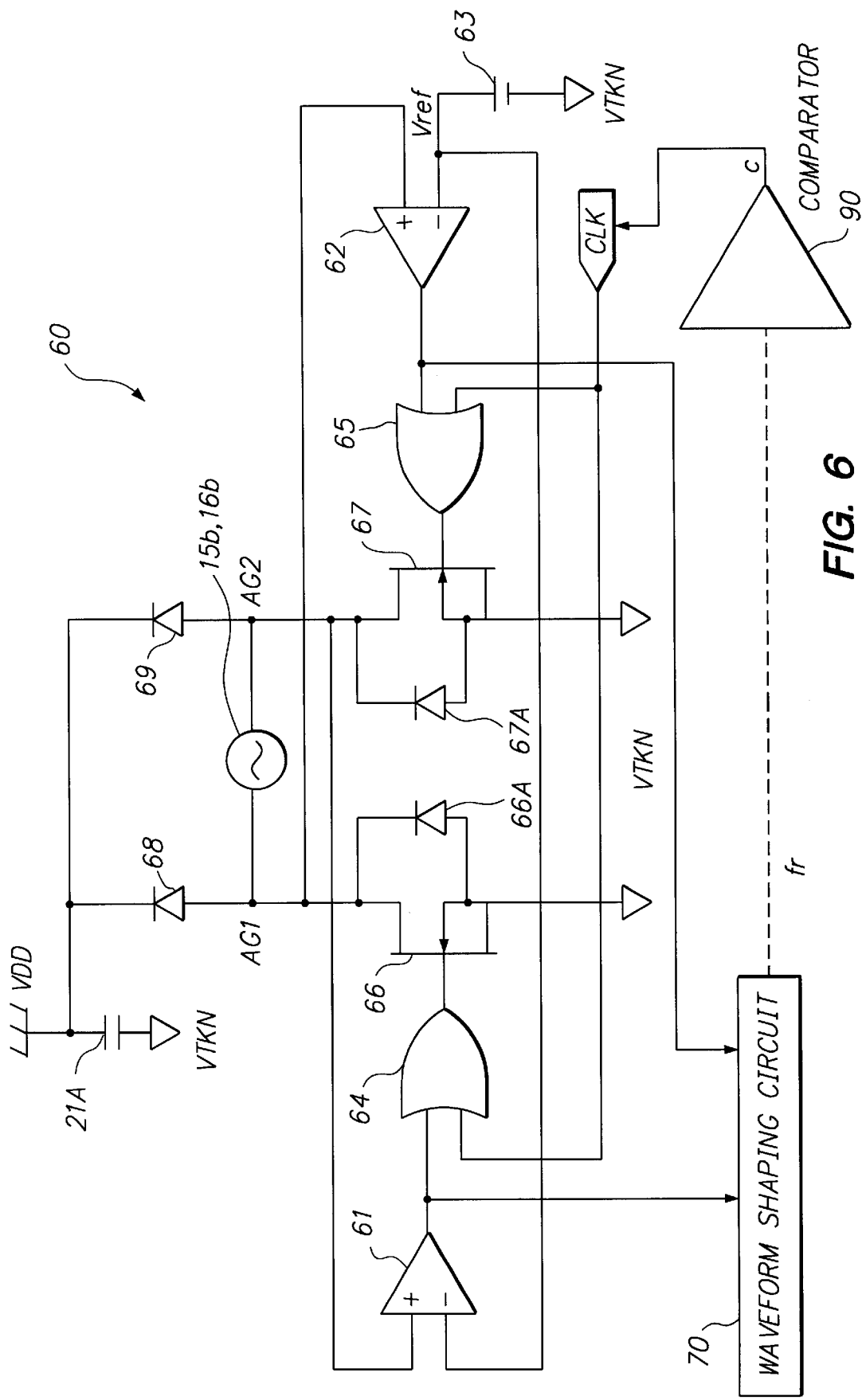
FIG. 6 is a circuit diagram showing a chopper charging circuit according to a first embodiment of the present invention.

A more detailed construction of this embodiment is shown in FIGS. 5 and 6.

As shown in FIG. 5, in this embodiment, a chopper charging circuit 60 is used as the brake circuit 23. The chopper charging circuit 60 includes: two comparators 61 and 62 connected to the coils 15b and 16b in the generator 20; a power supply 63 for supplying comparison reference voltage Vref to the comparators 61 and 62; OR circuits 64 and 65 for outputting the logical sums of outputs from the comparators 61 and 62, and a clock output (control signal) from the brake control circuit 56; field effect transistors (FETs) 66 and 67 which are connected to the coils 15b and 16b and which have gates connected to the outputs of the OR circuits 64 and 65; and diodes 68 and 69 connected to a capacitor 21A provided in the rectifying circuit 21. The FETs 66 and 67 are provided with parasitic diodes 66A and 67A.

The capacitor 21A has a positive electrode set to voltage VDD, and a negative electrode set to VTKN (V/TANK/Negative: Negative electrode of battery). Similarly, the negative electrode of the power supply 63, and the sources of the transistors 66 and 67, are set to VTKN. Accordingly, in the chopper charging circuit 60, the transistors 66 and 67 are controlled so that the generator 60 is short-circuited to VTKN, whereby chopper boosting is performed so that when the generator 60 is open, it obtains voltage VDD or greater. Therefore, the comparators 61 and 62 compare an increased, generated voltage and arbitrarily set voltage Vref between VDD and VTKN.

In the chopper charging circuit 60, outputs from the respective comparators 61 and 62 are also supplied to a waveform shaping circuit 70. Accordingly, the chopper charging circuit 60 and the waveform shaping circuit 70 constitute the rotation detection circuit 53.

Figure 7:
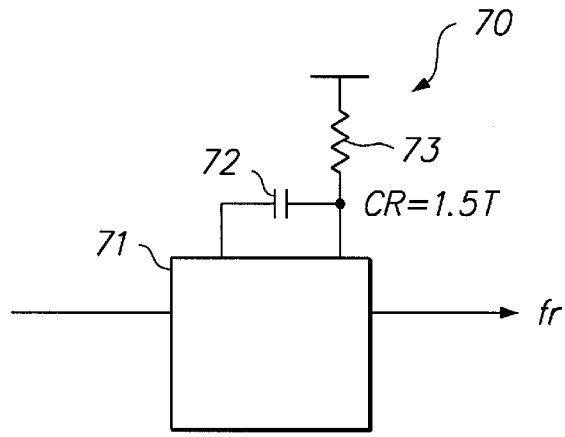
FIG. 7. is a block diagram showing an example of a waveform shaping circuit according to a first embodiment of the present invention.
Figure 8:
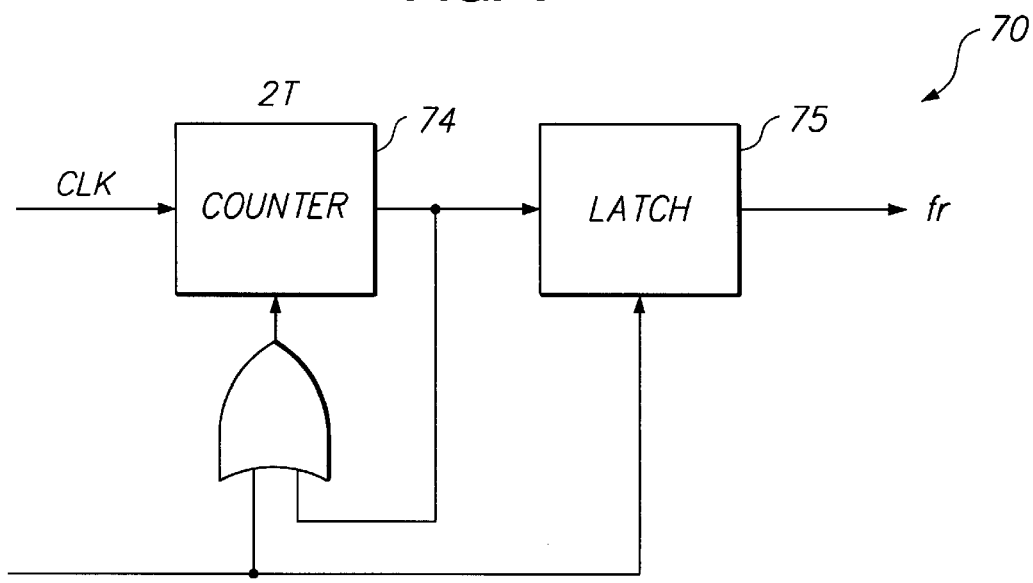
FIG. 8 is a block diagram showing another example of a waveform shaping circuit according to a first embodiment of the present invention.

A monostable multivibrator (single shot type) 71 as shown in FIG. 7, or a type using a counter 74 and a latch 75 as shown in FIG. 8, for example, are used as the waveform shaping circuit 70.

The phase comparison circuit 54 includes an analog phase comparator, and a digital phase comparator. By way of example, CMOS-type phase comparators, etc., can be used. The phase comparison circuit 54 detects the phase difference between 10-Hz time-standard signal fs from the frequency-dividing circuit 52, and rectangular-wave pulses fr from the waveform shaping circuit 70, and outputs a difference signal.

The difference signal is input to a charge pump (CP) 80, in which it is converted into a voltage level, and the voltage level is processed by a loop filter 81 composed of a resistor 82 and a capacitor 83 so that its high-frequency components are eliminated. Accordingly, the charge pump 80 and the loop filter 81 constitute the LPF 55.

Level signal a output from the loop filter 81 is input to a comparator 90. Triangular waves b, obtained by converting a signal by a frequency-dividing circuit 91 for performing frequency-division to 50 Hz to 10 kHz, and a triangular-wave generating circuit 92 using an integrator, etc., are input to the comparator 90. The comparator 90 outputs rectangular pulse signal c based on level signal a from the loop filter 81 and triangular wave signal b. Therefore, the comparator 90, the frequency-dividing circuit 91, and the triangular-wave generating circuit 92 constitute the brake control circuit 56.

Rectangular pulse signal c output from the comparator 90 is input as clock signal CLK to the chopper charging circuit 60 as described above.

Figure 9:
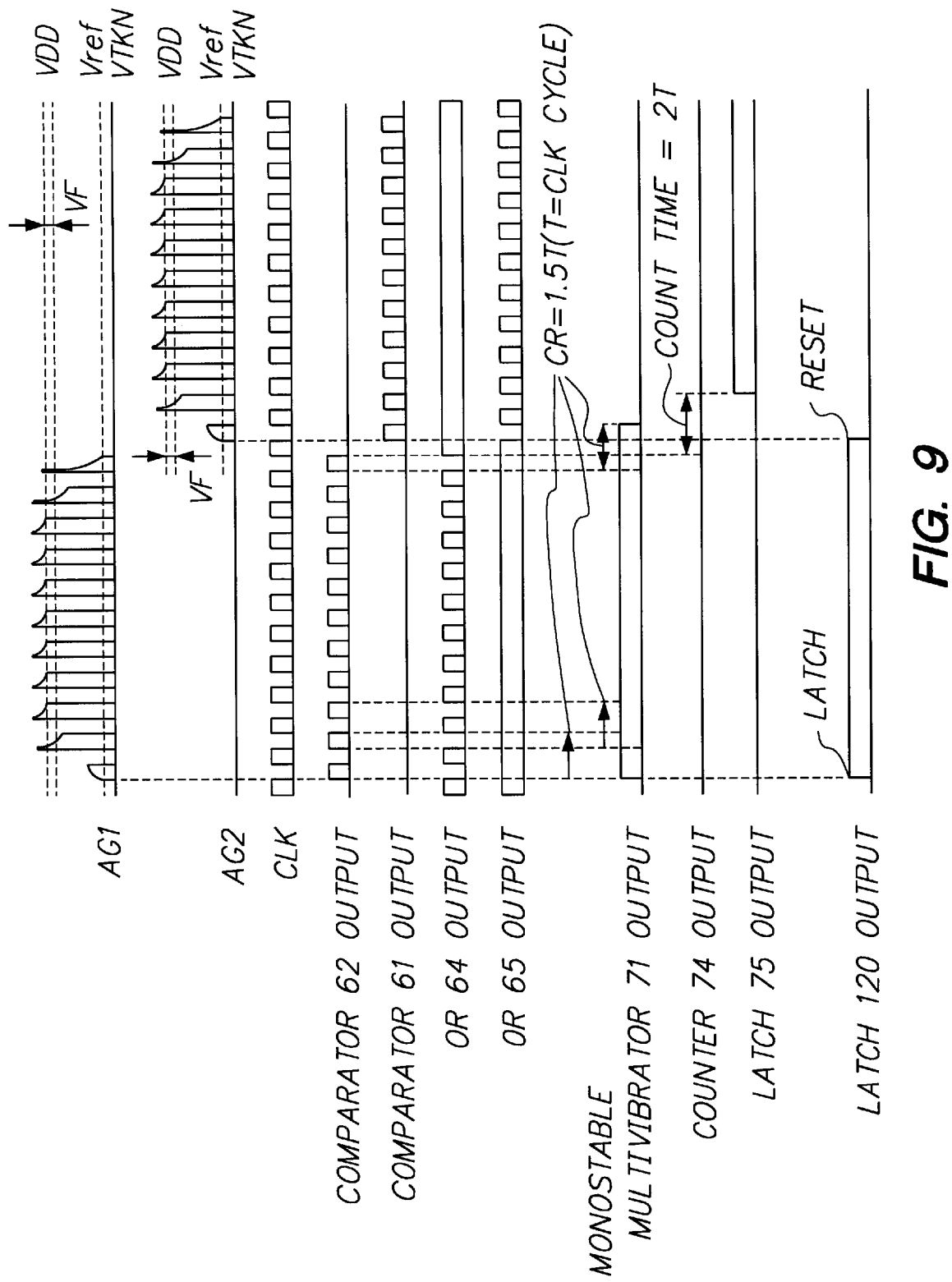
FIG. 9 is a waveform chart according to a first embodiment of the present invention.

Next, the operation of this embodiment is described with reference to FIGS. 9 and 10.

When the rotor 12 of the generator 20 rotates by the spring 1a, the respective coils 15b and 16b output alternating-current waveforms in accordance with change in magnetic flux. The waveforms are input to the respective comparators 61 and 62. Each comparator 61 or 62 compares the input with voltage Vref from the power supply 63. The comparisons by the comparators 61 and 62 detect timing of a polarity for switching on the transistors 66 and 67.

In other words, the voltage-increasing charging of the capacitor 21A, and the chopper-braking of the generator 20 can be performed by only inputting the clock signal CLK to the gates of the transistors 66 and 67. In the case where control is performed using only the clock signal, when the clock signal is at its Hi-level, the transistors 66 and 67 are simultaneously activated to generate short-circuiting, and when the clock signal is at its Lo-level, it passes through one of the parasitic diodes 66A and 67A and one of the diodes 68 and 69 to charge the capacitor 21A. Specifically, when AG1 is positive, charging is performed using a path from the parasitic diode 67A to the diode 68 via the coils 15b and 16b, and when AG2 is positive, charging is performed using a path from the parasitic diode 66A to the diode 69 via the coils 15b and 16b.

In this case, two diodes are connected in series in each charging path, a voltage drop for the sum of the rise voltages VF of the respective diodes is generated. Therefore, the capacitor 21A cannot be charged unless the charging voltage is not less than a voltage obtained by adding the voltage drop to the potential of the capacitor 21A. This is a significant factor decreasing charging efficiency in the case of a generator whose generated voltage is small, such as an electronically controlled mechanical timepiece.

Accordingly, in this embodiment, the transistors 66 and 67 are not switched on or off, but timing therefor is controlled, whereby charging efficiency is increased.

In other words, when AG1 is positive with respect to VTKN, and is more than voltage Vref, the comparator 62 outputs a Hi-level signal. Thus, the OR circuit 66 continuously outputs the Hi-level signal, irrespective of clock signal CLK, whereby a voltage is applied to the gate of the transistor 67, and the transistor 67 is switched on.

In addition, the comparator 61 connected on the AG1 side outputs a Lo-level signal because AG2<voltage Vref The OR circuit 64 outputs a signal synchronized with the clock signal. The transistor 66 continuously performs on/off operation. The chopper voltage increasing in terminal AG1 is performed.

At this time, when the transistor 66 is switched off after being switched on, a charging path of AG1 to the diode 68 to the capacitor 21A to VTKN to the transistor 67 (its source to drain) to AG2 is formed, and the parasitic transistor 67A is positioned off the path. Thus, a voltage drop is small, and charging efficiency is improved.

Concerning the level of voltage Vref, it is preferable to select a generated voltage level that performs the chopper voltage increasing of a voltage generated by the generator 20 so that the capacitor 21A can be charged. Normally, the voltage level may be set at a level that is several hundred mV greater than VTKN. When voltage Vref is set at a high level, a period until the comparators 61 and 62 operate is long, and during the period a charging path in which two diodes are connected in series as described above is formed, so that power generating efficiency decreases by that amount.

When the transistor 66 is switched on, short-circuiting in the generator 20 occurs to cause short braking since the transistor 67 is also switched on, and the quantity of generated power decreases. However, by short-circuiting the generator 20 on the VTKN side, voltage increasing to a voltage not less VDD can be performed when the transistor 66 is open. Thus, by setting the cycle of chopping for switching on/off, at a predetermined cycle, a decrease in the quantity of power generated when short braking is performed can be compensated, and braking torque can be increased with the generated power maintained at a constant or greater.

Also, in the case where the output from the generator 20 is directed to the AG2 side, the operations of the comparators 61 and 62, and the transistors 66 and 67, are only switched, and operations similar to those described above are performed. The outputs of the comparators 61 and 62 in the chopper charging circuit 60 are input to the waveform shaping circuit 70, and are converted into rectangular-wave pulses fr.

By way of example, the monostable multivibrator 71 in FIG. 7 performs waveform shaping based on only one polarity detection result (the output of the comparator 62). Specifically, only at the rise of the output of the comparator 62, the monostable multivibrator 71 is triggered, and pulses having a length set by CR are output. The CR time constant is set at not less than approximately 1.5 times as long as one cycle of clock signal CLK. Within the pulse time set by CR, the rise of the next output of the comparator 62 is input to the monostable multivibrator 71, and it is retriggered. Accordingly, the monostable multivibrator 71 continuously outputs a hi-level signal until the rise of the output of the comparator 62 is not generated within time 1.5T set by CR, whereby rectangular-wave pulses fr corresponding to an output signal of the generator 20 are output. The rise time of pulses fr is delayed by the CR setting time—the Hi-level period of the polarity detection pulses, and as shown in FIG. 9, when CR is 1.5T, a delay is generated by 1.5T−0.5T=1T.

Also the waveform shaping circuit 70 shown in FIG. 8 performs waveform shaping based on only one polarity detection result (the output of either the comparator 61 or 62). Specifically, the waveform shaping circuit 70 includes a counter 74 for counting the clock signals for time 2T and clearing the count, and a latch circuit 75 for performing latching with an output from the counter 74. The counter 74 and the latch circuit 75 are reset by the output of either the comparator 61 or 62. By way of example, in the case where an output from the comparator 62 is generated as shown in FIG. 9, the latch circuit 75 and the counter 74 are reset, and output fr is output as a Lo-level signal. When an output from the comparator 62 is not generated, output fr is latched at its Hi-level.

When the output from the comparator 62 is generated again, the latch signal is cleared, and output fr is at its Lo-level, so that rectangular wave pulses can be obtained. When the output from the comparator 62 is generated within the counter set time (2T), latching is not performed. Also, in this case, as shown in FIG. 9, the rise of the Hi-level of rectangular wave pulses fr is delayed by the set time (2T) of the counter 74.

The waveform shaping circuits 70 in FIGS. 7 and 8 perform conversion into rectangular wave pulses by delaying the output of the comparator 62. This prevents pulse deformation by using the CR set time and the counter set time because, since the output from the comparator 62 cannot always be obtained as a signal synchronized with the cycle of the clock signal, but as a so-called pulse-missing output, direct conversion into rectangular wave pulses causes pulse deformation. The CR set time and the counter set time may be determined depending on the amount of pulse deformation, and may be set at approximately cycle 1.5 to 5T. In a control aspect, such a delay causes almost no adverse effects. Rectangular wave pulses fr shaped as described above are compared with time standard signal fs of the frequency-dividing circuit 52 by the phase comparison circuit 54, and the difference signal is converted into level signal a through the charge pump 80 and the loop filter 81.

Figure 10:
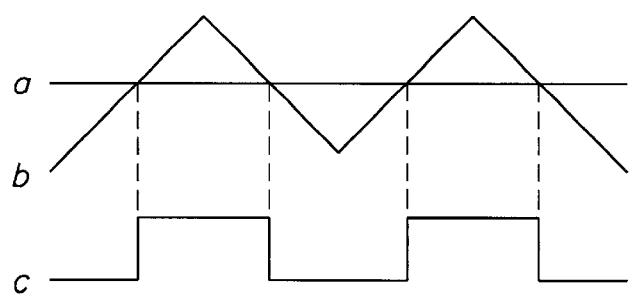
FIG. 10 is a drawing showing processing by a comparator in a brake control circuit according to a first embodiment of the present invention.

The comparator 90 outputs rectangular-wave-pulse signal c, using level signal a and triangular signal b from the triangular-wave generating circuit 92, as shown in FIG. 10. Level signal a is set so that it is lower than a standard level when rectangular-wave pulses fr based on the rotation of the rotor 12 is ahead of time standard signal fs and so that it is higher than the standard level when rectangular-wave pulses fr are behind time standard signal fs.

Accordingly, in the case where rectangular-wave pulses fr are ahead of time standard signal fs, the H-level state of rectangular-wave-pulse signal c is long lasting, and the short brake time of each chopper cycle in the chopper charging circuit 60 increases by the prolonged state, so that braking is enhanced to reduce the velocity of the rotor 12 of the generator 20. Conversely, in the case where rectangular-wave pulses fr are behind time standard signal fs, the L-level state of rectangular-wave-pulse signal c is long lasting, and the short brake time of each chopper cycle in the chopper charging circuit 60 decreases by the prolonged state, so that braking is weakened to increase the velocity of the rotor 12 of the generator 20. Thereby, control for rectangular-wave pulses fr to match time standard signal fs is performed.

According to the above-described embodiment, the following effects are obtained.

(1) By providing the VCO 25 comprised of the generator 20 and the brake circuit 23, and the phase-difference compensating circuit comprised of the phase comparison circuit 54 and the brake control circuit 56, PLL control is used to control the rotation of the generator 20. Therefore, since the brake level in the brake circuit 23 can be set by comparing the generated-power waveform for each cycle with another, the activation of a locked range enables stable, rapidly responsive control and the elimination of phase difference unless the waveform of generated power remarkably changes suddenly.

(2) The brake circuit 23 is formed by using the chopper charging circuit 60, and the use of chopping enables brake control, whereby braking torque can be increased while generated power is maintained at a constant or greater. Thereby, while the system stability is being maintained, efficient brake control can be performed.

(3) By using the chopper charging circuit 60, not only brake control but also the charging of the capacitor 21A in the rectifying circuit 21, and detection of the rotation of the rotor 12 of the generator 20, is realized by the chopper charging circuit 60. Compared with the case where the respective functions are realized by using separate circuits, circuit arrangement can be simplified to reduce the number of components and to reduce cost, and production efficiency can be improved.

(4) In the chopper charging circuit 60, timing for control of switching each transistor 66 or 67 is adjusted, and with either transistor 66 or 67 switched on, the other is switched on or off, whereby a voltage drop in the charging path can be reduced to improve power generating efficiency. This is therefore effective because in the case where the small generator 20 must be used, particularly in an electronically controlled mechanical timepiece, the power generating efficiency can be improved.

(5) Since the waveform shaping circuit 70 is provided, even if the circuit arrangement of the chopper charging circuit 60, etc., is modified and the output waveform from the VCO 25 differs, the different part of the output waveform can be absorbed by the waveform shaping circuit 70. Accordingly, if the circuit arrangement of the chopper charging circuit 60 differs, the rotation control circuit 50 can be used in common, and the component cost can be reduced.

(6) In the case where a general circuit composed of a low-pass filter (LPF) and a comparator is used as the waveform shaping circuit 70, an LPF comprised of, e.g., a first-order-lag CR filter, etc., is charged with part of generated voltage obtained by chopper voltage increasing, which is a factor increasing the efficiency of charging the capacitor 21A. However, each waveform shaping circuit 70 in this embodiment performs digital processing, whereby current consumption can be suppressed to be low, and the efficiency of charging the capacitor 21A can be improved.

Next, a second embodiment of the present invention is described. In the embodiment, by denoting components similar or identical to the above-described embodiment by identical reference numerals, descriptions are omitted or simplified.

Figure 11:
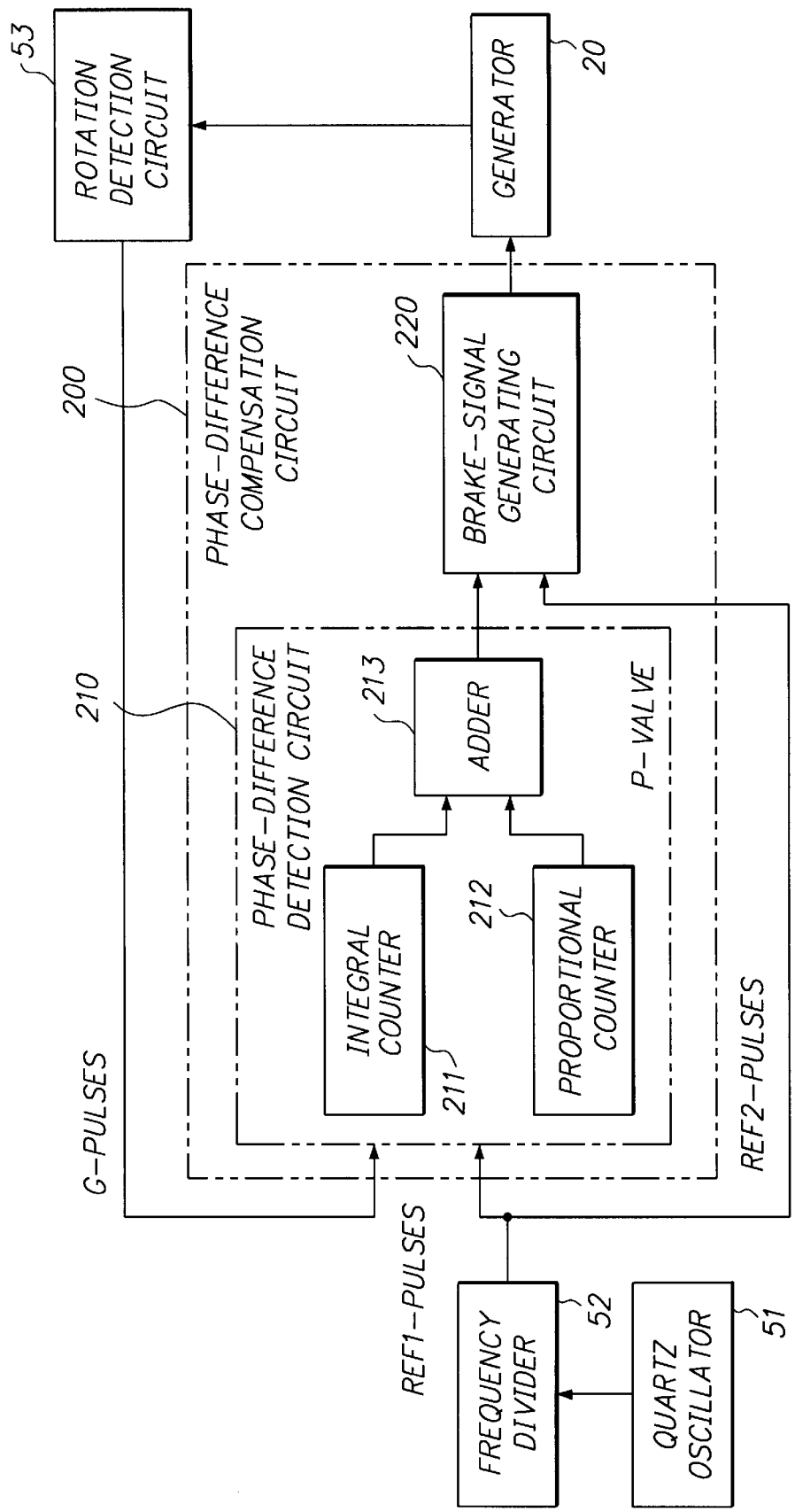
FIG. 11 is a block diagram showing main components of a second embodiment of the present invention.
Figure 12:
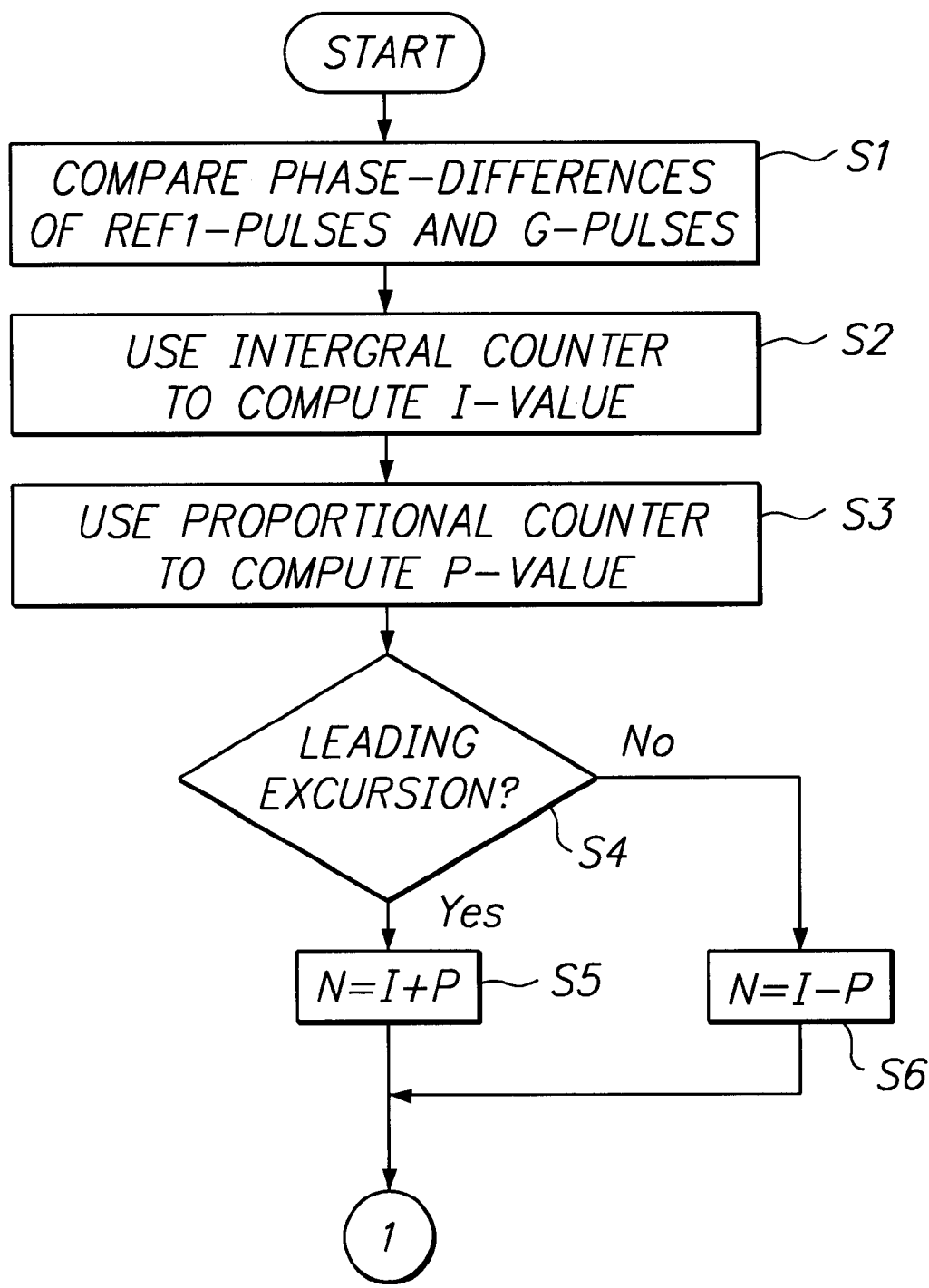
FIG. 12 is a flowchart showing a control method according to a second embodiment.
Figure 13:
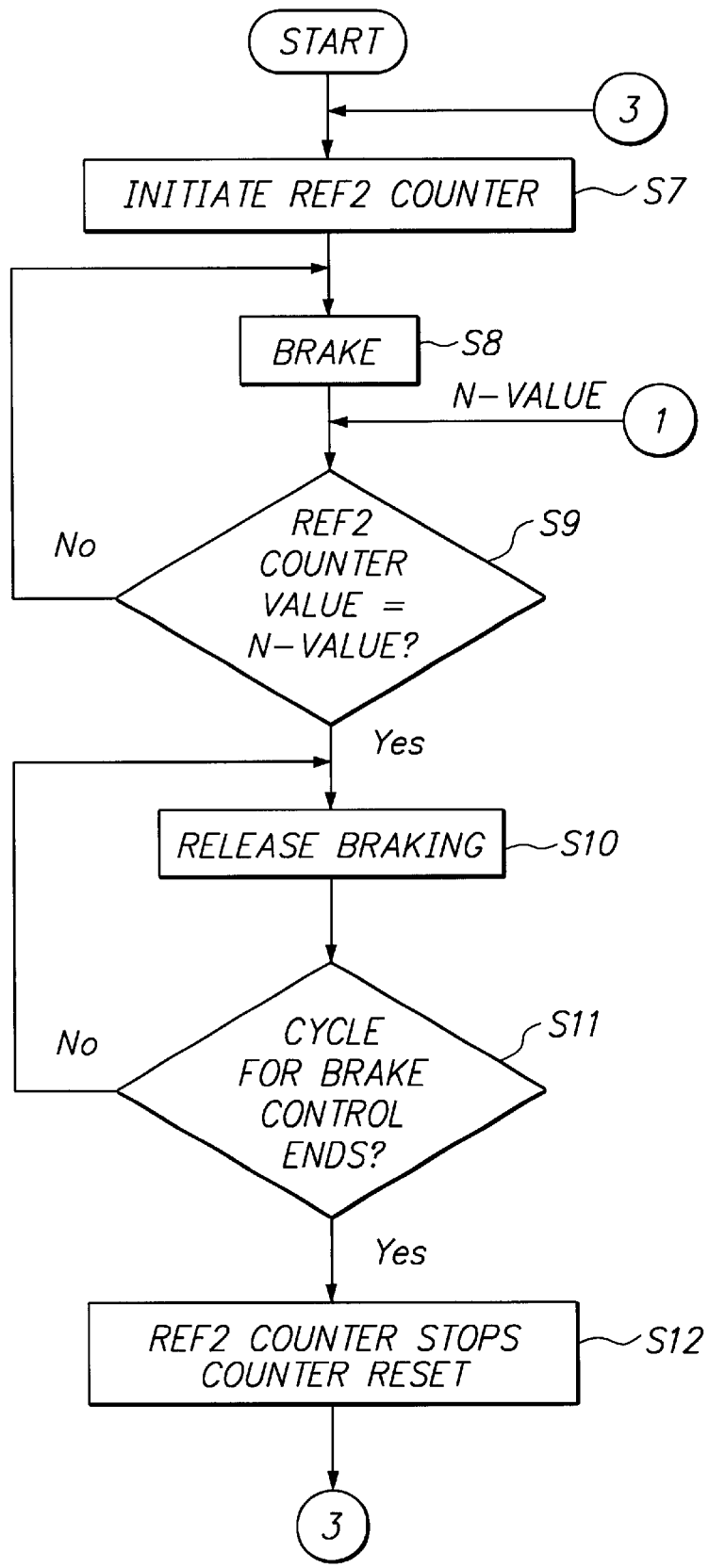
FIG. 13 is a flowchart showing the continuation of control in the flowchart in FIG. 12.

Concerning an electronically controlled mechanical timepiece according to the embodiment, the specific structure of a rotation control circuit differs from that in the first embodiment. Specifically, the rotation control circuit according to the embodiment includes an oscillator circuit (quartz oscillator) 51, a frequency divider 52, a phase-difference compensating circuit 200, a generator 20, and a rotation detection circuit 53, as shown in FIG. 11. Other components necessary for an electronically controlled mechanical timepiece are similar to those in the first embodiment.

The frequency divider 52 outputs first reference clock pulses (Ref1 pulses) and second reference clock pulses (Ref2 pulses). The frequency of the Ref2 pulses is set to be extremely higher than the frequency of the Ref1 pulses.

The phase-difference compensating circuit 200 includes a phase-difference detection circuit 210, and a brake-signal generating circuit 220 as a phase-difference compensating circuit. The phase-difference detection circuit 210 includes an integral counter 211, a proportional counter 212, and an adder 213.

A method for controlling the generator 20 in the embodiment is described with reference to FIGS. 12 to 15.

Initially, generator-rotation-cycle pulses (G pulses) from the rotation detection circuit 53, and the first reference clock pulses (Ref1 pulses) from the frequency divider 52, are compared for phase differences (step 1)(a step is hereinafter abbreviated to "S").

Next, the integral counter 211 is used to find an I-value (S2), and the proportional counter 212 is used to find a P-value (S3).

Figure 14:
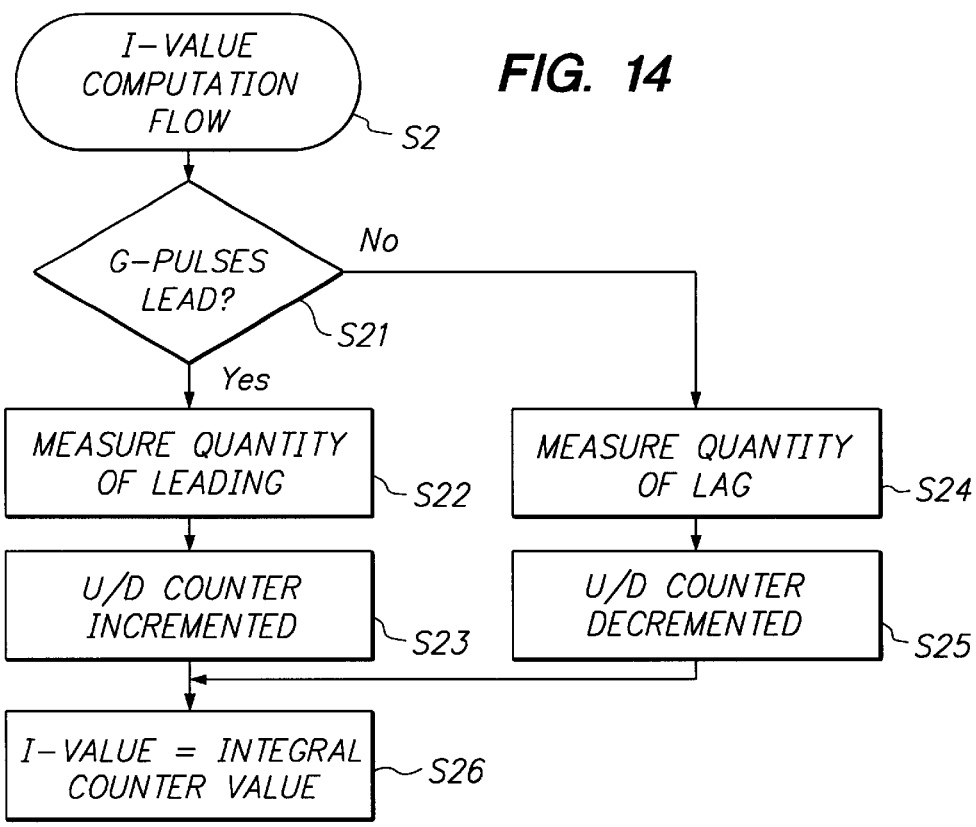
FIG. 14 is a flowchart showing the I-value computation flow in FIG. 12.

A technique in which the integral counter 211 finds the I-value is performed in accordance with the I-value computation flow shown in FIG. 14. In other words, by comparing the Ref1 pulses and G-pulses as to phase difference within one cycle, it is determined whether the G-pulses are ahead (S21).

If the G-pulses are ahead in the step, by counting their leading time using integral gain pulses Ci, the leading quantity is measured (S22), and the integral counter (U/D counter) 211 is incremented (S23). If the G-pulses are behind, by counting their lag time using integral gain pulses Ci, the lag is measured (S24), and the integral counter (U/D counter) 211 is decremented (S25). Therefore, a value counted by the integral counter 211 is a multiple of phase excursion time measured using integral gain pulses Ci, and this is used as the I-value (S26).

Figure 15:
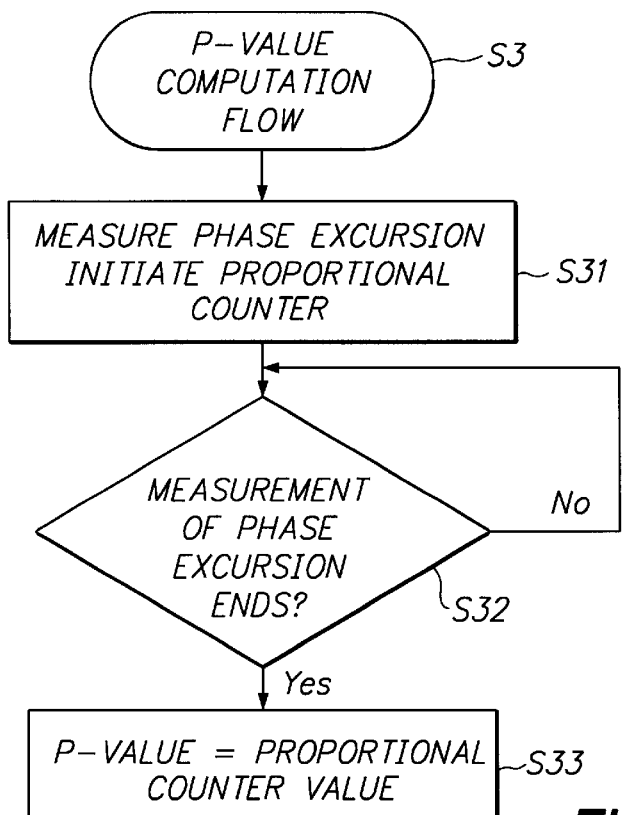
FIG. 15 is a flowchart showing the P-value computation flow in FIG. 12.

In addition, a technique in which the proportional counter 212 finds the P-value is performed in accordance with the P-value computation flow shown in FIG. 15. In other words, phase excursions based on the leading or lag G-pulses are counted using proportional gain pulses Cp, and phase excursion time is measured by the proportional counter (S31). By detecting, for example, the disappearance of an input from a measurement panel (proportional gain pulses Cp), which is input to the counter while the phase difference is being generated, it is determined whether phase excursion measurement ends (S32). When the measurement ends, the proportional counter value is set to the P-value (S33). At this time, specifically, the proportional counter value is stored as the P-value in a register, and the proportional counter is subsequently reset.

It is determined whether the stored value is a leading excursion (leading phase) (S4). If the stored value is a leading excursion, the operation N=I+P is executed (S5). If the stored value is a lag excursion, the operation N=I−P is executed to find the N-value. The N-value sets a braking time in one cycle period of the generator 20, as described below. In the case where the rotation cycle pulses of the generator 20 are ahead of the reference clock pulses, the N-value increases as a result of I+P, which further increases the braking time. In the case where the rotation cycle pulses of the generator 20 are behind the reference clock pulses, the N-value decreases as a result of I−P, which further reduces the braking time. Accordingly, the N-value is also used as a phase-difference compensation signal.

Concerning integral gain pulses Ci and proportional gain pulses Cp, the relationship between their frequencies is Ci<<Cp. Therefore, the P-value functions so as to actively suppress a phase excursion due to a rapid disturbance, etc., as in the case where when the electronically controlled mechanical timepiece is used as a watch, the motion of an arm causes the rotor 12 or the like to have an acceleration, while the I-value functions so as to control a slow change due to the unwinding of the spring 1a.

The brake-signal generating circuit 220 includes a Ref2 counter for measuring the second reference clock pulses (Ref2 pulses). The brake-signal generating circuit 220 uses the Ref2 counter to start counting the Ref2 pulses while the phase-difference detection circuit 210 is computing the N-value (S7), and simultaneously performs braking (S8).

It is determined whether the value measured by the Ref2 counter is equal to the computed N-value (S9). When these values are equal, the braking of the generator 20 is released (S10).

Next, by, for example, detecting whether the Ref2 counter is incremented, it is determined whether a predetermined one cycle set for braking control terminates (S11). If the predetermined cycle terminates, the Ref2 counter is stopped to be reset (S12), and the counting of the Ref2 pulses by the Ref2 counter is restarted (S7).

Specifically, the Ref2 counter consists of, e.g., a 4-bit ripple counter that repeatedly performs re-counting from zero when finishing counting from zero to fifteen. When the Ref2 counter equals zero (S7), the braking state is activated (S8), and the braking is continuously performed until the computed N-value is equal to the Ref2 counter value (S9). When the N-value is equal to the Ref2 counter (S9), the braking is released (S10), and the braking-released state is maintained until the Ref2 counter value has a 4-bit full count, namely, fifteen (S11). When the Ref2 counter value returns from fifteen to zero (S12), the braking state is activated (S7 and S8).

Accordingly, the N-value sets the brake time in one cycle period of the generator 20. Thereby, the generator 20 is synchronized with the first reference clock pulses in frequency and phase, with its frequency and phase being close to those of the first reference clock pulses. Thus, the pointers indicate an accurate time.

In the second embodiment, the second reference clock pulses (Ref2 pulses), in which each frequency has the relationship Ref1 pulses>>Ref2 pulses, are used. By using the Ref2 pulses whose frequency is extremely higher than that of the Ref1 pulses, the chopper charging circuit in the first embodiment can be controlled by the Ref2 pulses.

Figure 16A:
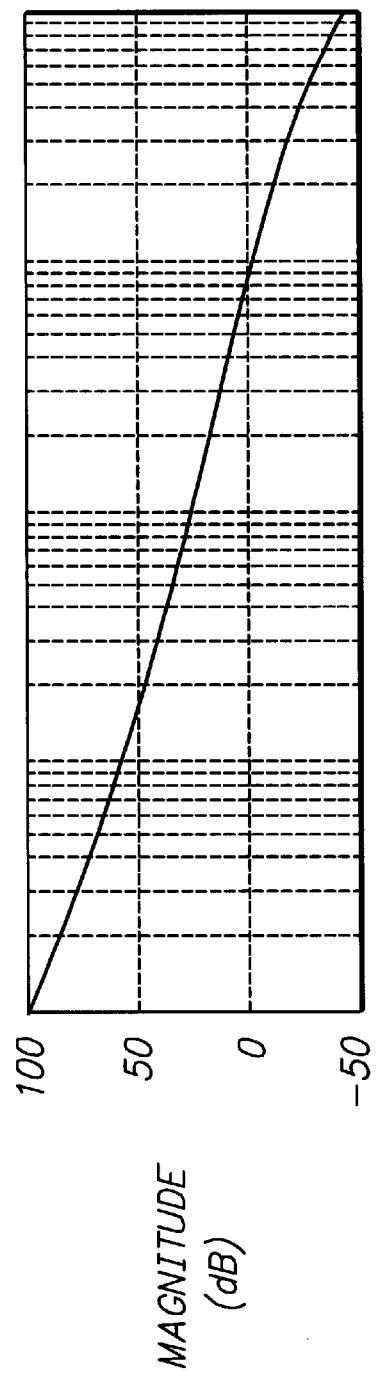
FIG. 16 is a Bode diagram according to a second embodiment.
Figure 16B:
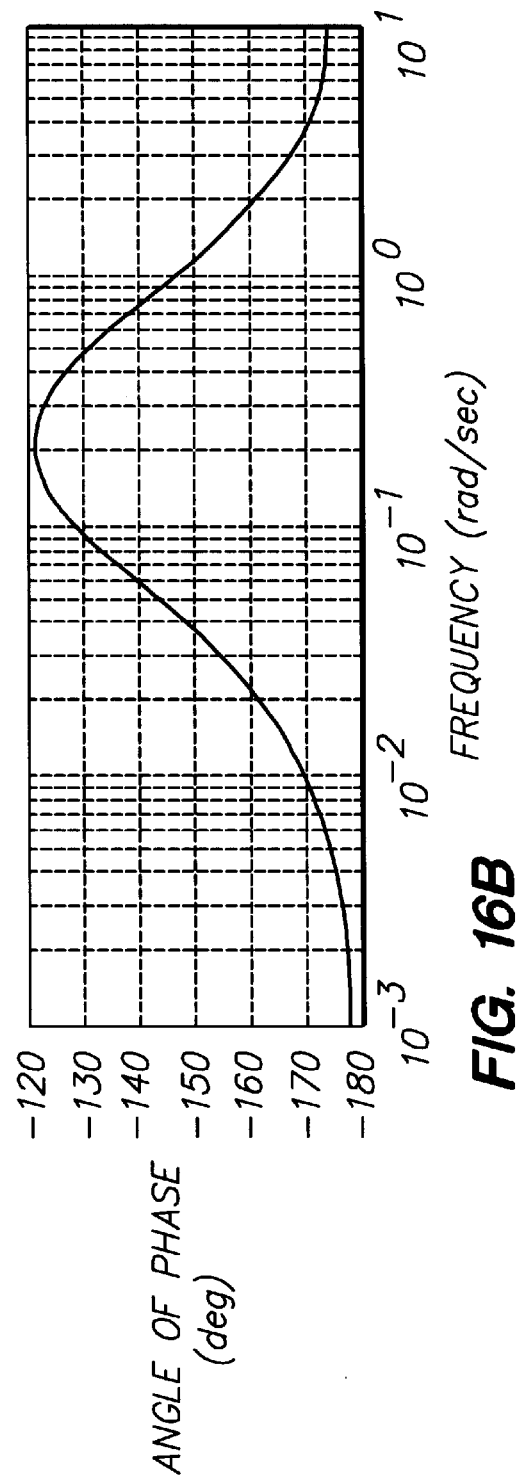
Figure 21A:
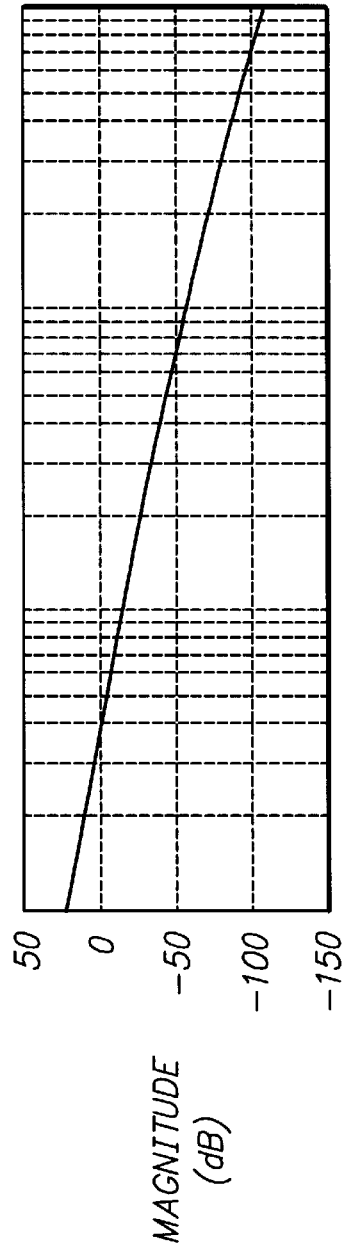
FIG. 21 is a Bode diagram according to a conventional example.
Figure 21B:
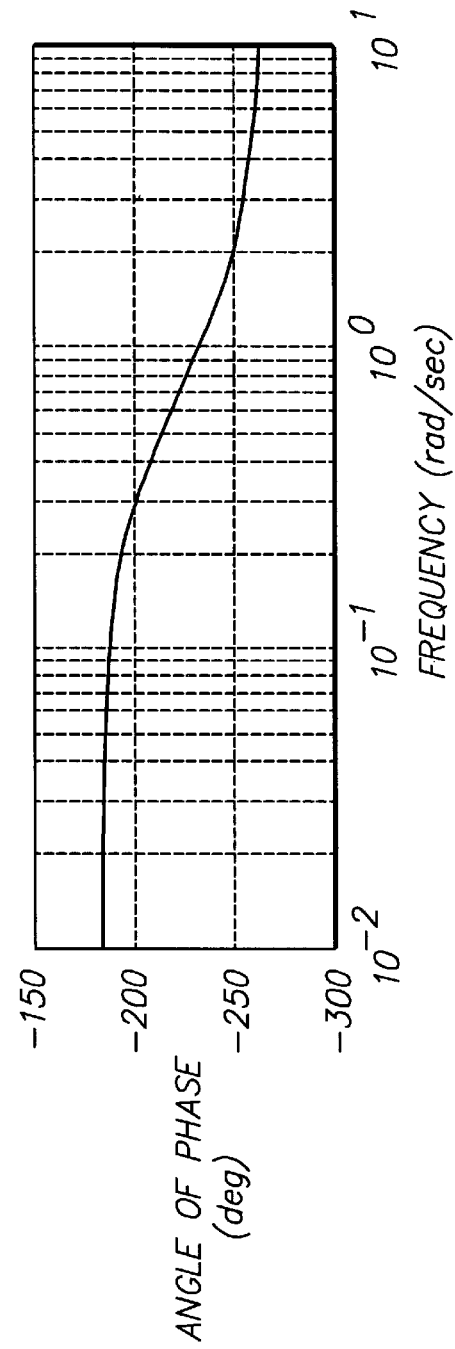
Figure 22A:
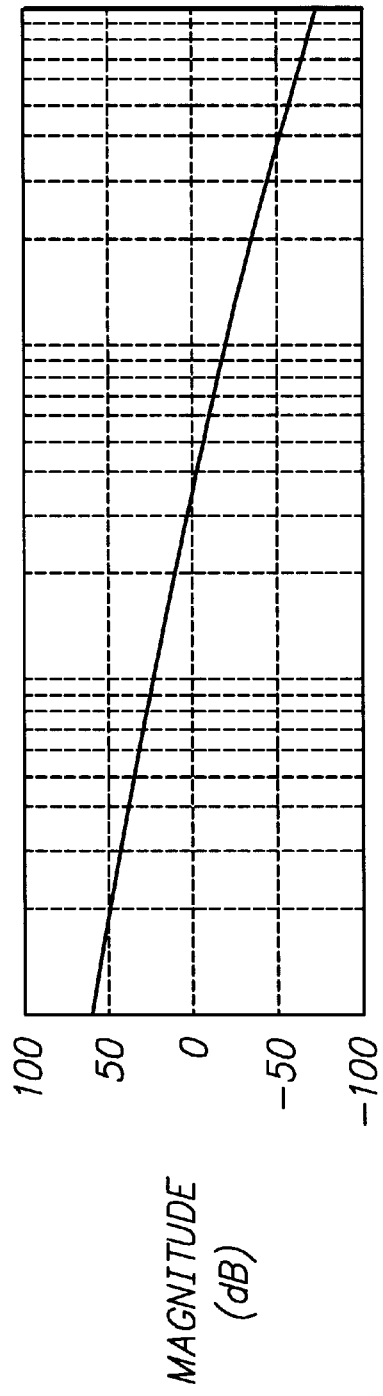
FIG. 22 is a Bode diagram according to a conventional example.
Figure 22B:
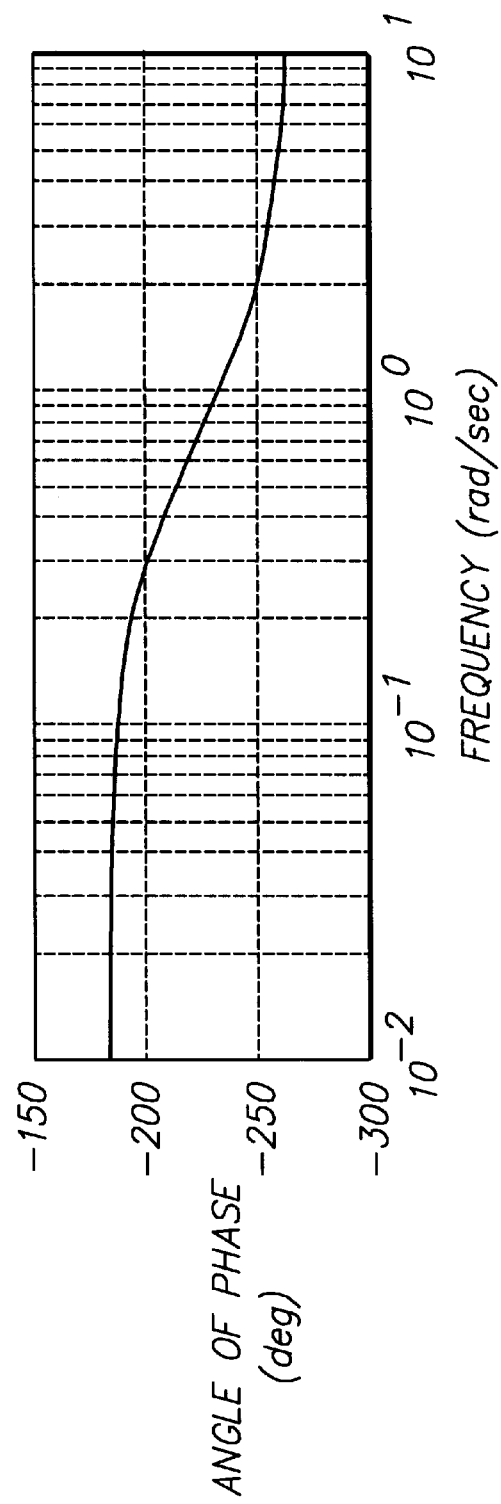

A Bode diagram in which integral control and proportional control are combined similarly to the first embodiment is shown in FIG. 16. According to the diagram, phase allowance is approximately 400, gain allowance is not less than −40 db, and the responsive frequency is 0.16 Hz, so that the responsive velocity can be set to be approximately ten times the related art shown in FIGS. 21 and 22.

The second embodiment also uses PI control, similarly to the first embodiment, and accordingly provides operations and effects similar to the operations and effects (1) to (6).

In addition, (7) the use of the second reference clock pulses (Ref2-pulses) having a high frequency enables the second embodiment to be applied to a control flow for the chopper charging circuit.

The present invention is not limited to each embodiment, but includes modifications and improvements in a range where the object of the present invention can be achieved.

Figure 17:
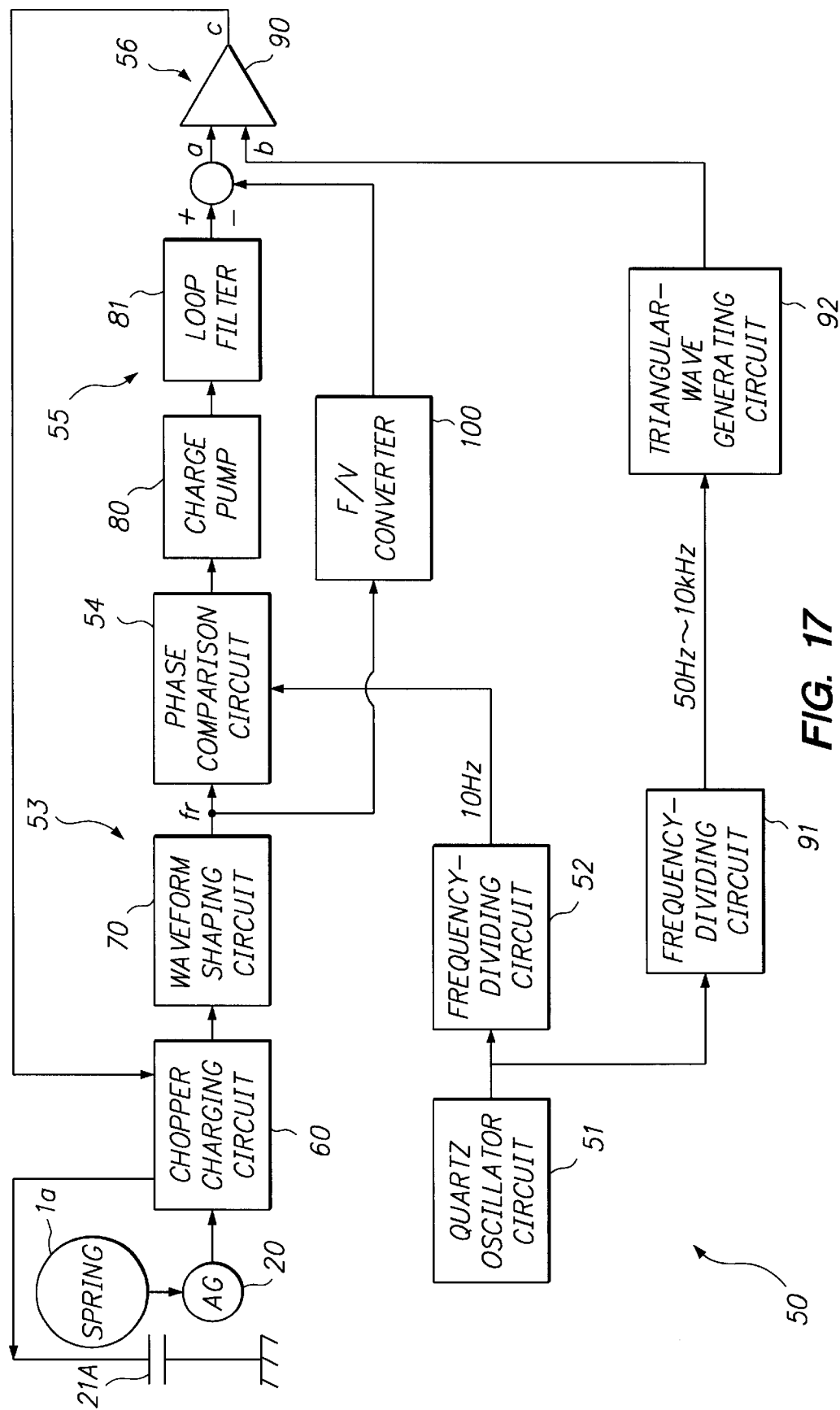
FIG. 17 is a block diagram showing a modification of the present invention.

By way of example, as shown in FIG. 17, the rotation control circuit 50 may be provided with a frequency-to-velocity (F/V) converter 100 for converting the output frequency of a waveform shaping circuit 70 into velocity information. By providing the F/V converter 70, rotation velocity information on a generator 20 can be obtained, and the time constant of a control circuit can be reduced, so that responsiveness can be improved, and the rotation velocity of the generator 20 can be controlled so as to quickly approach a set velocity, i.e., a time standard signal. Accordingly, if the waveform of generated power remarkably changes suddenly, and is out of a set range, rapid response can be performed to maintain control, whereby a more stable system can be provided.

Figure 18:
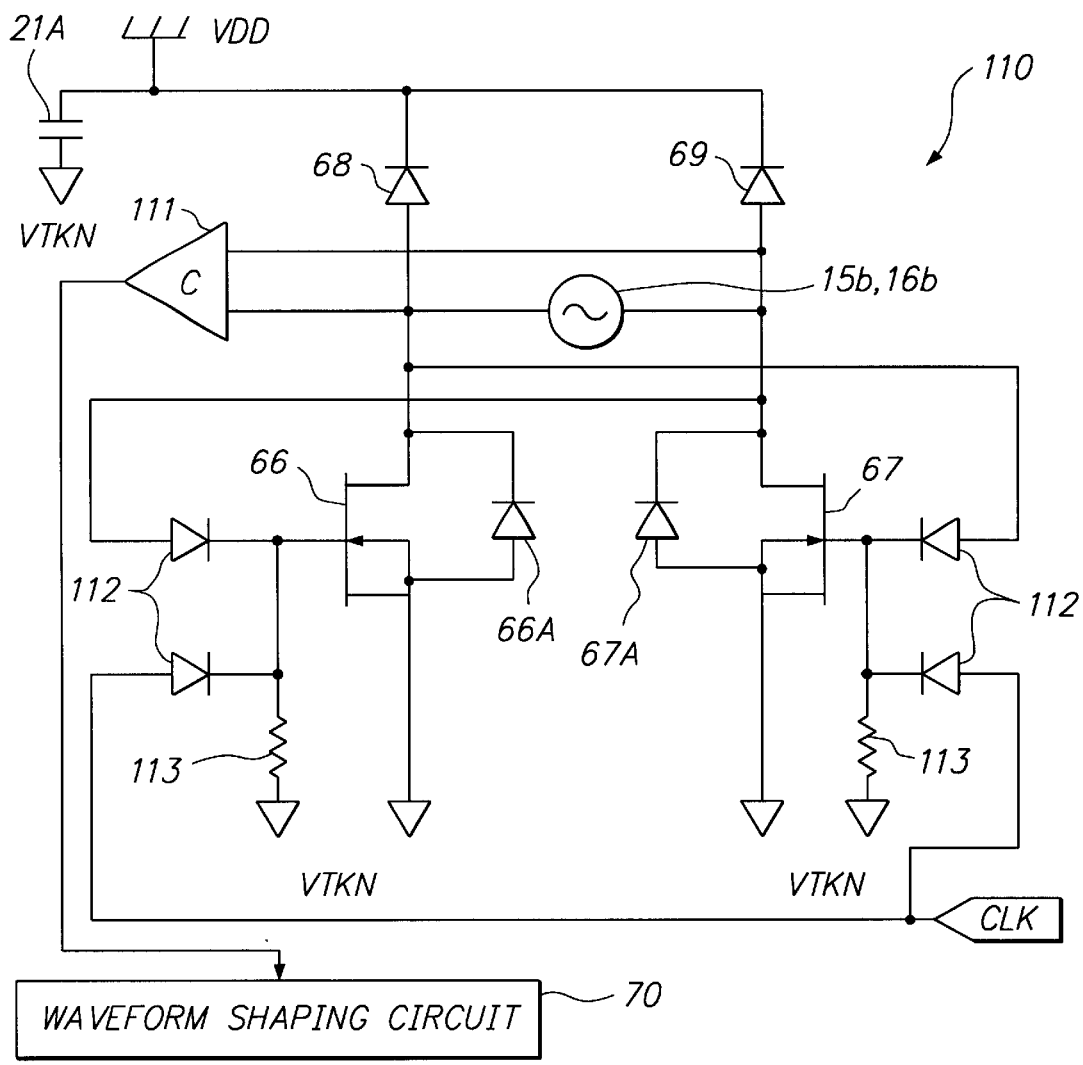
FIG. 18 is a circuit diagram showing a modification of a chopper charging circuit according to the present invention.

A chopper charging circuit 60 is not limited to the one in the embodiment. Alternatively, a chopper charging circuit 110 that includes one comparator 111 for detecting the polarity of a rotor 12, a diode 112 for performing the chopping of transistors 66 and 67, and a resistor 113, as shown in FIG. 18.

In the embodiment, since the comparators 61 and 62 are used for polarity detection, the power supply 63 for comparing reference voltage Vref is necessary. However, in this embodiment, the need for the power supply can be eliminated. In the chopper charging circuit 110, in order that the transistors 66 and 67 may be controlled to be in conduction for the polarity of a power-generating coil, the transistors 66 and 67 are driven by passing a coil-end voltage through diodes 112. Accordingly, the coil-end voltage must be increased to be greater than voltage (threshold voltage) Vth capable of driving the transistors 66 and 67+rise voltage Vf of the diodes 112. For example, if Vth=0.5 V and diode Vf=0.3 V, this condition alone requires 0.8 V, and the generator 20 requires a power-generating ability of approximately 1.0 to 1.6 V. For this reason, the chopper charging circuit 60 in the embodiment that drives the transistors 66 and 67 without using the diodes is preferable in that an efficient chopper charging operation from a small generated voltage of the generator 20 can be performed.

In addition, the chopper-charging-circuit structure may be formed by changing the type of the transistors 66 and 67 of the chopper charging circuit 60 in FIG. 6 to the P-ch type, exchanging them and the diodes 68 and 69, and short-circuiting them to positive VDD of the capacitor 21A for voltage increasing so that when the transistors 66 and 67 are open, their voltage is not more than the voltage of VTKN. In this case, outputs from the comparators 61 and 62, and clock signal CLK, are logically added by an AND circuit, and are input to the gates of the transistors 66 and 67.

Moreover, the structures of the rotation detection circuit 53, the LPF 55, and the brake control circuit 56 are not limited to ones comprised of the waveform shaping circuit 70, the charge pump 80 and the loop filter 81, the comparator 90, and the frequency-dividing circuit 91 and the triangular-wave generating circuit 92 as in the embodiment, but may be appropriately provided for practicing the present invention.

Figure 19:
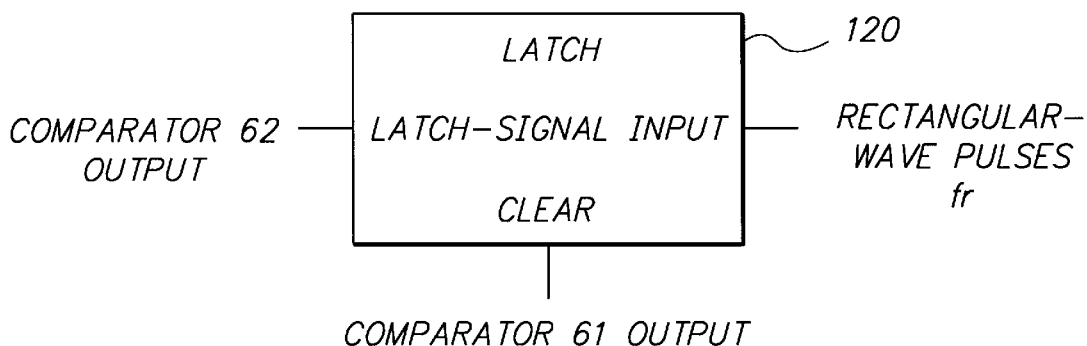
FIG. 19 is a block diagram showing a modification of a waveform shaping circuit accord to the present invention.
Figure 20:
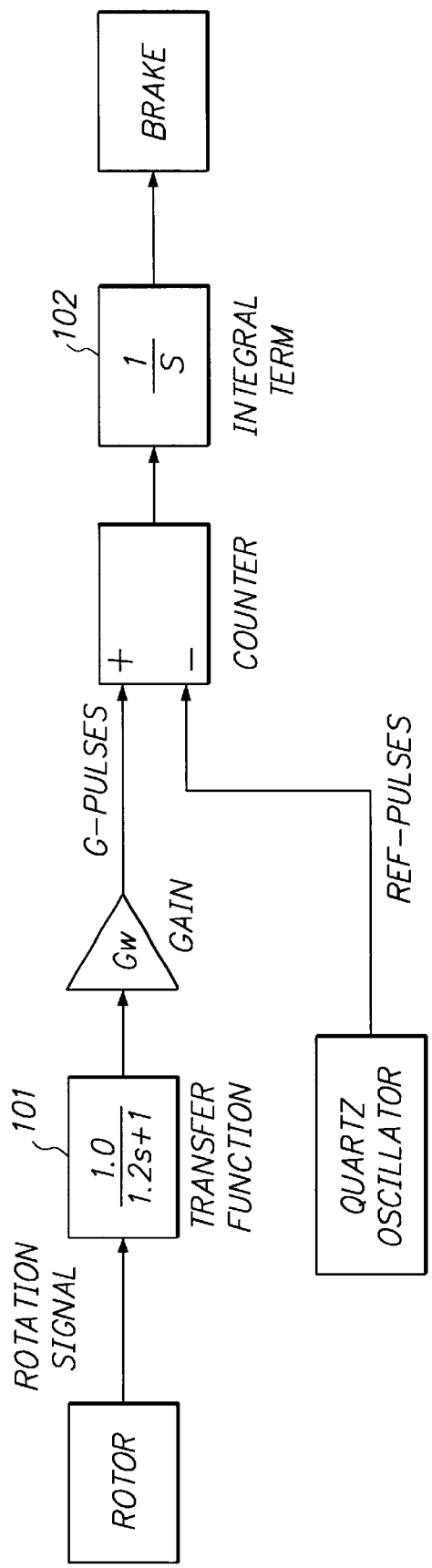
FIG. 20 is a block diagram showing the construction of a conventional example related to the present invention.

By way of example, concerning the waveform shaping circuits 70, a latch 120 as shown in FIG. 19 may be used. The waveform shaping circuit 70 uses an output from either comparator 61 or 62 to perform the shaping of rectangular-wave pulses fr, as also shown in FIG. 9. However, a waveform shaping circuit 70 according to FIG. 13 performs the latching of the latch 120 at the rise of an output from the AG1 polarity detection (comparator 62), and resets the latch 120 at an output from the comparator 61 for AG2. This case has advantages in that no time delay occurs and accurate detection can be performed, although two outputs need to be used. By performing latching at an output for AG1, if pulse missing is generated in the output for AG1, it is ignored, which can prevent it from affecting rectangular-wave pulses fr.

In addition, the brake circuit 23 is not limited to one using chopping, but may be one that performs braking by using the VCO to changing current flowing in the coils 15b and 16b. It may be appropriately selected for practicing the present invention.

As described above, according to the present invention, PLL control is realized in an electronically controlled mechanical timepiece, whereby phase excursions can be eliminated, and control-system response can be quickened.

The present invention is not limited to watches, but may be applied to spring-driven clocks and wall clocks, etc.

Industrial Applicability

As described above, an electronically controlled mechanical timepiece and a control method therefor according to the present invention are useful to various types of electronically controlled mechanical timepieces that use a generator to convert mechanical energy in the unwinding mode of a spring into electrical energy, and drive a rotation control circuit with the electrical energy, whereby controlling the rotation cycle of the generator, and in particular, to small electronically controlled mechanical timepieces used as watches.

What is claimed:

1. An electronically controlled mechanical timepiece comprising:

a mechanical energy source;

a wheel train;

a generator driven by said mechanical energy source and connected to said mechanical energy source by said wheel train, said generator generating induced electric power for supplying electric energy;

a brake circuit that brakes said generator;

pointers connected to said wheel train ;

and a rotation control circuit that controls said brake circuit to control the rotation cycle of said generator;

wherein said rotation control circuit comprises:

a phase-difference compensating circuit; and a voltage-controlled oscillator including said generator and said brake circuit;

wherein said phase-difference compensating circuit comprises a phase-comparison circuit that compares the phases of a rotation signal of said generator and a target signal and provides an output signal based on said comparison;

and a brake control circuit that controls said brake circuit based on said output signal from said phase-comparison circuit.

2. An electronically controlled mechanical timepiece according to claim 1, wherein said rotation control circuit comprises a waveform shaping circuit that converts an output waveform of said voltage-controlled oscillator into rectangular-wave pulses as said rotation signal to said phase-comparison circuit.

3. An electronically controlled mechanical timepiece according to claim 1, wherein said rotation control circuit comprises a frequency-to-velocity converter that converts the frequency of an output signal from said voltage-controlled oscillator into velocity, and said brake control circuit outputs a braking control signal to said brake circuit in response to said output from said phase-comparison circuit and an output from said frequency-to-velocity converter.

4. An electronically controlled mechanical timepiece according to claim 1, wherein said phase-difference compensating circuit comprises a phase-difference detection circuit and a compensation-signal generating circuit that receives an output from said phase-difference detection circuit, said rotation signal and said target signal are repetitive pulses, said phase-difference detection circuit includes counters for counting the number of times the rotation and target signals rise or fall, and one of said counters increments or decrements when said target or rotation signal rises or falls, and outputs a phase-difference signal to said compensation-signal generating circuit.

5. An electronically controlled mechanical timepiece according to claim 4, wherein said phase-difference detection circuit comprises:

an integral counter for measuring a total number of the phase excursion periods of said rotation signal and said target signal;

a proportional counter for measuring phase excursion periods;

and an adder for increasing or reducing the value of each counter in accordance with a lead or lag of the phase excursion of said rotation signal with respect to said target signal.

6. A control method for an electronically controlled mechanical timepiece including a mechanical energy source connected to a generator by a wheel train, said generator generating induced electric power for supplying electric energy, a brake circuit for braking said generator, pointers connected to said wheel train, a rotation control circuit that controls the rotation cycle of said generator by controlling said brake circuit, said rotation control circuit comprising a voltage-controlled oscillator including said generator and said brake circuit, and a phase-difference compensating circuits said phase-difference compensating circuit comprising a phase-comparison circuit and a brake control circuit that controls said brake circuit based on an output of said phase comparison circuit, the method comprising:

generating a target signal corresponding to a target number of revolutions;

generating a rotation signal of said generator corresponding to a braking amount of said brake circuit;

comparing said target signal to said rotation signal to detect a phase difference therebetween and generating a phase-difference compensation signal in accordance with said detected phase difference; and inputting to said voltage-controlled oscillator said phase-difference compensation signal to control said brake circuit in order to minimize the phase difference between said target signal and said rotation signal.

7. A control method for an electronically controlled mechanical timepiece according to claim 6, wherein said rotation control circuit comprises a waveform shaping circuit, and said method further comprises converting an output waveform of said voltage-controlled oscillator into rectangular-wave pulses as said rotation signal to said phase-comparison circuit.

8. A control method for an electronically controlled mechanical timepiece according to claim 6, wherein said rotation control circuit comprises a frequency-to-velocity converter, and said method further comprises converting the frequency of an output signal from said voltage-controlled oscillator into velocity, and outputting a braking control signal to said brake circuit in response to an output from said phase-comparison circuit and an output from said frequency-to-velocity converter.

* * * * *

UNITED STATES PATENT AND TRADEMARK OFFICE
CERTIFICATE OF CORRECTION

PATENT NO.   : 6,252,828 B1
DATED        : June 26, 2001
INVENTOR(S)  : Osamu Shinkawa et al.

It is certified that error appears in the above-identified patent and that said Letters Patent is hereby corrected as shown below:

<u>Title page,</u>
ABSTRACT,
Line 6, insert -- the generator (20) by controlling the brake circuit (23). The rotation control circuit -- after "of".

<u>Column 16,</u>
Line 27, change "circuits" to -- circuit, --.

Signed and Sealed this

Twenty-sixth Day of March, 2002

*Attest:*

JAMES E. ROGAN
*Attesting Officer*       *Director of the United States Patent and Trademark Office*